(12) United States Patent
Yost et al.

(10) Patent No.: US 12,209,980 B2
(45) Date of Patent: Jan. 28, 2025

(54) ADSORBATE ANALYSIS USING OPTICALLY STIMULATED ELECTRON EMISSION

(71) Applicant: Analytical Mechanics Associates, Inc., Hampton, VA (US)

(72) Inventors: William T. Yost, Newport News, VA (US); Daniel F. Perey, Yorktown, VA (US); Paul Petzar, Yorktown, VA (US); John W. Connell, Yorktown, VA (US); Frank L. Palmieri, Yorktown, VA (US); Rodolfo I. Ledesma, Hampton, VA (US); Joshua L. Brown, Poquoson, VA (US)

(73) Assignee: Analytical Mechanics Associates, Inc., Hampton, VA (US)

( * ) Notice: Subject to any disclaimer, the term of this patent is extended or adjusted under 35 U.S.C. 154(b) by 715 days.

(21) Appl. No.: 16/403,151

(22) Filed: May 3, 2019

(65) Prior Publication Data
US 2019/0339216 A1    Nov. 7, 2019

Related U.S. Application Data

(60) Provisional application No. 62/666,658, filed on May 3, 2018.

(51) Int. Cl.
*G01N 23/2273*    (2018.01)
*G01N 21/27*    (2006.01)
(Continued)

(52) U.S. Cl.
CPC ......... *G01N 23/227* (2013.01); *G01N 21/272* (2013.01); *G01N 21/7703* (2013.01)

(58) Field of Classification Search
CPC ............. G01N 23/227; G01N 23/2273; G01N 21/272; G01N 21/7703
See application file for complete search history.

(56) References Cited

U.S. PATENT DOCUMENTS 4,099,923 A * 7/1978 Milberger ............ B01J 19/0093
                                                        422/211
4,590,376 A    5/1986 Smith
(Continued)

FOREIGN PATENT DOCUMENTS

EP        0172477 A2    2/1986
JP     2011007700 A2    9/2012

OTHER PUBLICATIONS

Zhou, Chuanyao, Zhibo Ma, Zefeng Ren, Alec M. Wodtke, and Xueming Yang. "Surface photochemistry probed by two-photon photoemission spectroscopy." Energy & Environmental Science 5, No. 5 (2012): 6833-6844. (Year: 2012).*
(Continued)

*Primary Examiner* — Paul S Hyun
(74) *Attorney, Agent, or Firm* — MUETING RAASCH GROUP

(57) ABSTRACT

A probe for collecting optically stimulated electron emission to inspect chemical reactions of a surface includes a light source to emit light on the surface, a collector, and a controller. The light source emits light on the surface. The collector is configured to detect photoelectrons emitted from the surface in response to the light from the light source impinging on the surface. The collector is further configured to provide a photocurrent based on the detected photoelectrons. The controller includes at least one processor and is operably coupled to the light source and the collector. The controller is configured to cause the light source to emit light on the surface, receive the photocurrent from the collector, and determine at least one chemical reaction of the surface based on the received photocurrent.

16 Claims, 12 Drawing Sheets

(51) Int. Cl.
  *G01N 21/77* (2006.01)
  *G01N 23/227* (2018.01)

(56) References Cited

U.S. PATENT DOCUMENTS

| | | |
|---|---|---|
| 4,945,239 A | 7/1990 | Wist et al. |
| 5,028,778 A | 7/1991 | Ninomiya et al. |
| 5,097,126 A | 3/1992 | Krivanek |
| 5,185,524 A | 2/1993 | Page |
| 5,260,584 A | 11/1993 | Popson et al. |
| 5,289,004 A | 2/1994 | Okada et al. |
| 5,393,980 A | 2/1995 | Yost et al. |
| 6,480,285 B1 | 11/2002 | Hill |
| 6,856,403 B1 | 2/2005 | Welch et al. |
| 10,302,556 B2 | 5/2019 | Yost et al. |
| 2012/0080616 A1 | 4/2012 | Schoenborn |
| 2012/0235036 A1 | 9/2012 | Hatakeyama et al. |
| 2017/0067819 A1* | 3/2017 | Yost .................. G01N 21/33 |

OTHER PUBLICATIONS

Bauer, M., C. Lei, R. Tobey, M. M. Murnane, and H. Kapteyn. "Time-resolved UPS: a new experimental technique for the study of surface chemical reactions on femtosecond time-scales." Surface science 532 (2003): 1159-1165. (Year: 2003).*

Wagner, C. D., L. E. Davis, M. V. Zeller, J. A. Taylor, R. H. Raymond, and L. H. Gale. "Empirical atomic sensitivity factors for quantitative analysis by electron spectroscopy for chemical analysis." Surface and interface analysis 3, No. 5 (1981): 211-225. (Year: 1981).*

Baghriche, O., S. Rtimi, C. Pulgarin, R. Sanjines, and J. Kiwi. "Effect of the spectral properties of TiO2, Cu, TiO2/Cu sputtered films on the bacterial inactivation under low intensity actinic light." Journal of Photochemistry and Photobiology A: Chemistry 251 (2013): 50-56. (Year: 2013).*

Xiao, Shou-Jun, Marcus Textor, Nicholas D. Spencer, and Hans Sigrist. "Covalent attachment of cell-adhesive, (Arg-Gly-Asp)-containing peptides to titanium surfaces." Langmuir 14, No. 19 (1998): 5507-5516. (Year: 1998).*

Palmberg, P. W. "A combined ESCA and Auger spectrometer." Journal of Vacuum Science and Technology 12, No. 1 (1975): 379-384. (Year: 1975).*

Bateman, Proc. Cambridge Phil. Soc., 15:423 (1910).

Bracewell, The Fourier Transform and its Applications, McGraw-Hill, Second Edition, New York, NY(1986) p. 101.

Evans, The Atomic Nucleus, McGraw-Hill, New York (1955) pp. 470-510.

Fermi, Nuclear Physics, University of Chicago Press, (1949) p. 155.

Mattes, Contamination Monitoring of RSRM Bonding Surfaces Using OSEE, *Proceedings—Institute of Environmental Sciences*, pp. 383-391 (1989).

Maurer, Handbook of Physics, Chapter 5, E.U. Condon & H. Odishaw, McGraw Hill, 1967, pp. 8-67 to 8-75.

PCT International Search Report and Written Opinion for PCT/US2016/049672, issued Nov. 14, 2016, 7 pages.

PCT International Preliminary Report on Patentability for PCT/US2016/049672, issued Mar. 6, 2018, 5 pages.

Welch et al., OSEE Inspection of Solid Rocket Motor Steel, NASA Conference Publication 3139, Third Conference on NDE for Aerospace Requirements, pp. 200-237, Jun. 1991.

* cited by examiner

ADSORBATE ANALYSIS USING OPTICALLY STIMULATED ELECTRON EMISSION

PRIORITY

This application claims benefit of U.S. Provisional Application No. 62/666,658 filed May 3, 2018, entitled "Adsorbate Analysis Using Optically Stimulated Electron Emission," which is incorporated herein by reference in its entirety.

The present disclosure herein relates to methods and processes for use in analysis of an adsorbate on a substrate using optically stimulated electron emission (OSEE), and further to systems, devices, and apparatus for performing and implementing such methods. The adsorbate analysis may be described as photo-induced emission analysis and may be used in various engineering, chemical, and biological applications.

GOVERNMENT RIGHTS

The invention described herein was made in part by employees of the United States Government and may be manufactured and used by or for the Government of the United States of America for governmental purposes without the payment of any royalties thereon or therefore. The Government of the United States of America has certain rights in this invention.

SUMMARY

It is to be understood that the illustrative technologies and applications covered by this disclosure may include various designs and refinements of hardware including probes and one or more various processes to general photo-chemical and photo-responsive biological systems and reactions.

Further, it is to be understood that the illustrative systems, apparatus, and methods described herein may be described as improving reliability of bonding used in current construction applications and providing various applications in chemical and biological laboratories. Also, it is to be understood that the technological adaptions outlined herein emphasize the application to surface-related chemistries that are affected by interactions with electromagnetic radiation (e.g., photons).

The illustrative systems, apparatus, and methods may further be described as responding to local geometries encountered on the assembly of complex, structures, even with dissimilar materials, and to obtain chemical, biological, and physical information about catalytic and other structures capable of photo-emission. Additionally, the illustrative systems, apparatus, and methods may be described as including techniques to monitor chemical and biological reactions, which cover not only identification but also evolution of species generated by photo-excited kinetics of the reacting components.

The illustrative systems, apparatus, and methods may be described as being configured to measure surface-based photo-induced chemical reactions with low levels of various constituents on surfaces with a variety of contours, and shapes as a means to locate and measure contaminants on surfaces (e.g., contaminant in this context may be one or more substances that interfere with bonding). In this disclosure, a photo-emitting surface or substrate onto which a chemical and/or biological specimen is located may be utilized, and the interaction between the surface and the specimen may cause a change in the photo-emitting properties of the substrate. Depending on the nature of specimen excitation, the work function of the substrate may be altered as the specimen reacts (e.g., the specimen may go to a metastable state or sequence of metastable states) by absorbing photon or photons (e.g., in two-photon absorbent sequences). The absorption process(es) may directly affect the efficiency of the photoemission from the substrate, and thus, may affect the photocurrent. Further, as the specimen reaction changes in time, so does the photocurrent from the substrate.

The present disclosure includes, among other things, a framework based on measurements of kinetic constants of the reactants on specific substrates, and allows for separation and specification of the reaction sequence. The illustrative approach may be described as being closer to specifying sequence patterns of physical and chemical reactions by introducing the sequencing of reacting component concentrations, which may afford the possibility of using sequencing as a means of identifying steps in a transformation, and thus, giving additional insights into photo-induced reactions. The illustrative systems, apparatus, and methods described herein may be a useful tool in catalysis studies, for example.

The information provided by the illustrative systems, apparatus, and methods described herein (e.g., instrument concepts) may extend analysis to general photo-chemical and photo-physical reactions by the fact that meta-stable excited states within the specimen (e.g., pathogen, contaminant, etc.) may change the local work function, and may be described as "opening up" some analytical techniques in these areas. The illustrative systems, apparatus, and methods discussed herein may include applications to chemical, biologically interesting molecules, and actual biological systems that absorb light to transform into excited states (e.g., fluoresce, or transfer energy to other molecules through collision processes) such as might be involved, for example, in photosynthesis.

Applications may include a variety of applications, such as residuals left on surfaces from previous processes, including contamination left behind by preparation techniques to residuals on crop spraying. Techniques to identify concentration levels, for example, may be encoded into the instrument's main-frame, as are the algorithms used to evaluate levels, determine pathogen-surface interactions, etc.

The illustrative systems, apparatus, and methods may include one or more specialized probes designed for specific applications to general systems and may share a common connection point to the measurement chassis, which controls sequencing and exposure control to optimize instrument collected data to the measurement task (e.g., provisions to simultaneously record surfaces of differing materials and different shapes, and algorithms in software to identify contaminating species and their concentrations, as well as compensating factors based on surface contours). Such affords the possibility of multiple wavelength and coherent radiation exposure (e.g., which may be useful in those applications where one needs to identify current densities that may occur after adsorbates become excited from the exposure to electromagnetic radiation) and the excitation of surface chemistry, and the identification of contaminant species from analysis of derivatives of collector currents during a exposure (e.g., brief exposure) to the selected radiations. The selected exposure radiation mixture may excite anywhere from a single time-dependent reaction to a variety of time-dependent chemical reactions, which may also contribute to the collector current, along with the optically stimulated electron emission (OSEE) from the substrate (e.g., usually stimulated with hard UV radiation).

Using the illustrative methods, processes, and techniques described herein, information about chemical reactions may be described as being encoded in the time variation in a function of the photocurrent from the substrate.

In the illustrative technology described herein, the photoelectron excitement may be described as being lower (e.g., less than or equal to about two electron-volts) than other technologies so that transitions in the molecular state are involved. Further, the illustrative methods, processes, and techniques may be described as being sensitive, for example, to different arrangements of molecules on the surface under study as each configuration of a surface-residing molecule will have a different kinetic constant. Still further, the illustrative methods, processes, and techniques may separate different reactions and allow for determination of concentrations of the states (e.g., sometimes metastable states) brought about by photo-excitation of these molecular states.

The present disclosure may be described as differing from the earlier techniques because the illustrative systems, apparatus, and methods utilize current-time relationships to aid in identification of concentrations of photo-active species attachments to the substrates, provide analysis that predicts the sequential relationships among excited states of reactants, and examine excited states in a substrate under examination by testing for complex surface-related chemistries where constituents are added for their specific photo-reactive properties.

The illustrative systems, apparatus, and methods are based on the photoelectric effect and provide insights into the class of reactions involved in photo-physics and photochemistry. A sequence of the illustrative systems, apparatus, and methods may be described as follows: structures or constituents are added to a surface, interact with illuminating electromagnetic radiation, and are boosted to excited states, and then a fraction of the illumination that reaches the substrate interacts with the substrate-located electrons causing an emission that depends upon the character of the constituent's bonds with the substrate. This emission is attracted to a collector surface where the current is measured. The current depends upon the areal density of the constituents (e.g., even the interactions among them), and the constituents change form and bonding characteristics during the exposure. The illustrative systems, apparatus, and methods described herein provide expressions for the concentration for each state, and develop an expression for the kinetic constant for each state. Stated another way, each form (e.g., metastable state) may change concentration in time, and expressions are derived for the sequentially produced components.

These actions may cause a variety of changes on the substrate, which, in turn, may alter the photo-current emitted from the substrate. This analysis may be used to develop a separation of interactions, not by energy, but rather by kinetic constants of reactions on the substrate chosen for the reaction under analysis, which may allow for the unfolding of time-dependent complex kinetics of molecular structures, including metastable states that interact with surface constituents in a way that alters the local surface electronic states. Each alteration has its own kinetic constant. As such, the illustrative analysis may separate the reactions by their kinetic constants, even though the energy states may be too close together for identification.

These states may affect localized electronic structures at the substrate's surface, which may result in enhanced or diminished photoelectron emission, and these same interactions may affect the localized work function of the substrate. Hence, minute differences in the photo-based emission efficiencies may give, or provide, time-dependent currents that are based on the state of the reactions. Further, it is to be understood that the present disclosure contemplates the mixing photons of different energies into the illumination source, and in this way, certain photo-reactions may be selected, or prescribed, for study.

In other words, the illustrative systems, apparatus, and methods may be based on photoelectric emission from a conducting or otherwise photo-electron emitting surface onto which components either exist (e.g., in the case of a contaminated surface) or are added through any process. The illustrative methods, processes, and techniques may be described as allowing for exploration of processes that affect current measurement technology based on optically stimulated electron emission from the substrate and that includes possibilities chosen for specific studies of surface-affected reactions. For examples, metals, carbon-based composites (e.g., graphene, carbon nanotubes, carbon fibers, high-density carbon nanotube impregnated polymers), epoxies, paints, metals, including non-reactive metals such as platinum, and reactive conductors in the sense of catalysis, and semiconducting substrates, such as single crystals of silicon, germanium, and conducting compounds, conducting grid overlays on photo-reacting materials, surface conduction effects of photo-induced charge carriers, surface states in high-Tc superconducting states in ceramics, microstructural effects and residual stresses on certain classes of reactions, etc. are possible surfaces. The illustrative analysis described herein may be further described as being based solely on the analysis of the time dependence of photoelectron emission current as a means of identifying processes, which may be more difficult to investigate by using other means. Hence, the present disclosure may be described as "dealing with" a means that permits an accurate profile in time of chemical reactions occurring on the reference surface.

An exemplary probe for collecting optically stimulated electron emission to inspect chemical reactions of a surface may include a light source to emit light on the surface, a collector, and a controller. The collector may be configured to detect photoelectrons emitted from the surface in response to the light from the light source impinging on the surface. The collector may further be configured to provide a photocurrent based on the detected photoelectrons. The controller may include at least one processor and may be operably coupled to the light source and the collector. The controller may be configured to cause the light source to emit light on the surface, receive the photocurrent from the collector, and determine at least one chemical reaction of the surface based on the received photocurrent.

An exemplary method for inspecting chemical reactions of a surface may include emitting light on the surface using a light source and receiving photoelectrons emitted from the surface in response to the light from the light source impinging on the surface using a collector. The exemplary method may further include receiving a photocurrent from the collector, the photocurrent based on the detected photoelectrons. Still further, the exemplary method may include determining at least one chemical reaction of the surface based on the received photocurrent.

An exemplary system for inspecting a surface may include one or more optically stimulated electron emission (OSEE) pods and a controller. Each of the one or more OSEE pods may include a light source to emit light on the surface and a collector configured to detect photoelectrons emitted from the surface in response to light from the light source impinging on the surface. The collector may further be configured to provide a photocurrent based on the detected photoelectrons. The controller may include at least one processor and may be operably coupled to the one or more OSEE pods. The controller may be configured to cause the light source of a first OSEE pod to emit light on a first area of the surface, receive a first photocurrent from the collector of the first OSEE pod, and determine at least one chemical reaction of the first area of the surface based on the received first photocurrent.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Exemplary embodiments shall be described with reference to FIGS. 1-12. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus and systems using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others. Unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements.

The photoelectric current is often directly related to many physical properties found at a surface such as oxide thickness, contamination level and mechanical condition. Calibration on surfaces of identical material having a wide variety of values for a particular property are tested to obtain voltages proportional to photoelectric current, whereby calibration curves are generated. Of course, the threshold current value is application specific.

Figure 1:
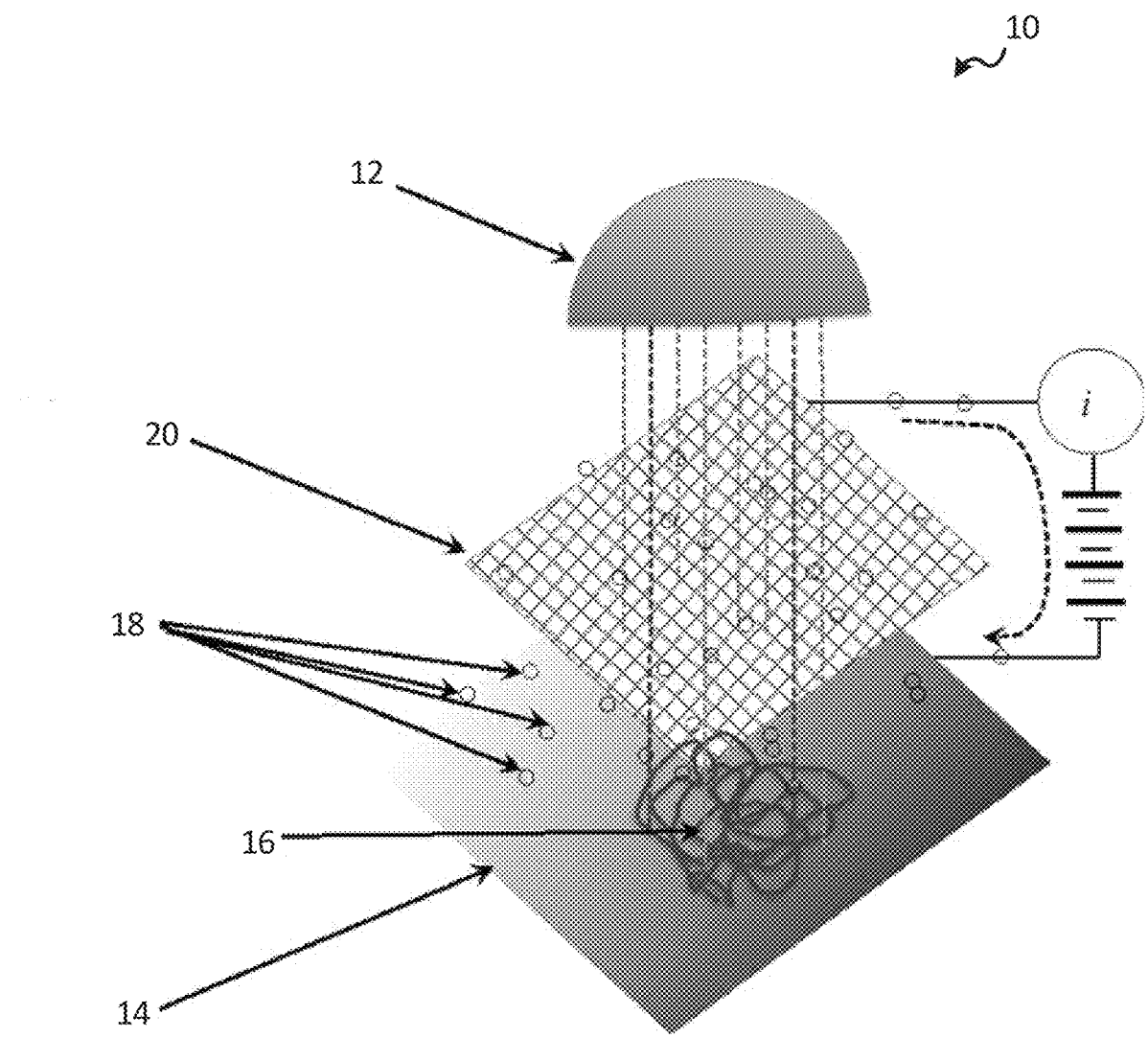
FIG. 1 is a schematic view of a probe, apparatus, or device for optically stimulated electron emission (OSEE) measurement of a surface according to an embodiment.

In one or more embodiments and as shown in FIG. 1, the system 10 may include an illumination source 12 that provides photons of the variety of frequencies to drive an adsorbate 16 into an excited state and provide for electron emission from a substrate or surface 14. The electrons 18 are those emitted from the substrate 14 with a maximum energy $\varepsilon_{mS}$. The adsorbate 16 alters the local value of $\varepsilon_{mS}$. The system may further include an electron collector 20 that provides the collection for the emitted electrons. The substrate 14 may be described as providing the stage where electron emission occurs and may also provide a stage sensitive to the chemistry under examination. The adsorbate 16 may include the components for the chemistry under examination. Further, the system 10 may include an external electron path for photo-electrons to return to the substrate 14.

The illumination source 12 may contain multiple wavelengths. One wavelength (e.g., schematically shown in FIG. 1 as dark grey dotted lines) may excite the adsorbate 16, which slightly changes photo-electron $\varepsilon_{mS}$ from the substrate in the region of the adsorbate. The emission from the substrate 14 outside of the illuminated area may emit electrons with a different $\varepsilon_{mS}$. As the concentration of adsorbate 16 changes, so does the photocurrent i. As the adsorbate 16 changes excitation with time, so does the photoelectron $\varepsilon_{mS}$ in the vicinity of the adsorbate.

Identification of adsorbate species, including those, which may be meta-stable species, and their levels may be useful because adsorbate species and levels are factors as possible progenitors of photo-induced surface reactions. While mechanisms can vary, chemical constituents may affect surface reactions. Surface reaction to these constituents through the mechanisms of interference with density of bonds between the surface and other embedded components (e.g., epitaxial layers of material on single crystal surfaces) and the effects of diffusion-related processes of constituents into the layers may lead to an alteration of conduction and cohesion within the layer itself.

The illustrative systems, apparatus, and methods may include specialized probes for identification of photo-induced species for use in in-depth analysis of the photocurrent time record for differentiation of photo-chemistries by substrate-related sensitivities to specific reactions or classes of reactions. Further, the illustrative systems, apparatus, and methods may provide multiple site measurements and measurement of significant environmental parameters to allow for the simultaneous measurements on different surface locations, perhaps even with different surface compositions, while making comparisons with "standard" reference surfaces, normally of the same composition. This can be done either from measurements, or from time/frequency/environmental measurement records stored in memory. The environmental measurements may allow for appropriate compensation for environmental effects.

The illustrative systems, apparatus, and methods may further include a provision designed to augment exposures to cause specific photo-reactions. With some substrate materials, radiation may affect surface bonds and may energize adsorbed molecules into desired surface chemistry in the presence of photonic exposures of certain energies. This is based on the analysis of chemically-induced reactions of adsorbed molecules on the substrate's surface, pumped into meta-stable states by the illumination content in the light source, while other radiation frequencies drive the photo-electric emission from the affected substrate.

The illustrative systems, apparatus, and methods may be configured to identify the sequential arrangements of meta-stable state concentrations brought on by photo-induced reactions to cover sequentially-induced molecular states on substrates. This analysis may be described as permitting more accurate separation of photo-reactants and their effects by providing an analytical model for a basis of photo-reaction analysis. Further, the identification of mechanisms for photo-generated charge-based current may "make possible" surface analysis of additional modes as the adsorbate undergoes changes during excitation processes.

The illustrative systems, apparatus, and methods may be described as providing a means for physical and chemical techniques for analysis of surface chemistry (e.g., surface chemistry of substrate 14). Further, the illustrative systems, apparatus, and methods may provide for evaluation of specific effects of surface treatments, unique substructures built into surfaces, catalytic effects, and conditions wherein catalysis is diminished. The illustrative systems, apparatus, and methods may provide for calculation and analysis of a time-dependence of molecular concentrations.

The illustrative systems, apparatus, and methods may include, among other things, probes (e.g., system 10) that are configured to measure chemistries activated by photo-induced changes in the reactants on a substrate. The probes may interrogate irregular and heterogeneous surfaces and may support the determination of specific surface conditions. Illumination and differential probe techniques may address assessment of spatially differential regional analysis of the substrate for more critical applications. The probes may further include enhancements such as use of reference surfaces for specific chemical reactions and specific attachment mechanisms of compounds. These probes may also be useful for differential comparison (e.g., to reveal concentration gradients on the surface) while scanning, or by comparison to digitally stored responses to known surface conditions. This illustrative technology may allow for multiple excitation frequencies (e.g., 2-photon excitation processes) of photo-induced chemical reactions.

The illustrative systems, apparatus, and methods may further include probes for applications in scanning of large acreage, including raster and array scanning techniques based on the instrument design concepts. For point measurements on critical aircraft fuselage, for example, a means of coordinate location for mapping measurement locations may be incorporated.

The illustrative systems, apparatus, and methods may be able to determine from a photo-current's time dependence (e.g., d(lni)/dt) the identity of substructures on substrates. This applies to materials including the metal or insulating substrate, composite materials, and materials composed of nano-structure-enhanced zones. The illustrative systems, apparatus, and methods may further be able to determine from a photocurrent's time dependence (e.g., d(lni)/dt) chemical reactions brought on by surface states, intermediate surface states, reactants and their surface locations, and the sequence (e.g., temporal sequence) of chemical reactions. These determinations may allow for a better understanding of chemical outcomes.

The Langmuir model of chemisorption and the photo charge emission characteristics of the variety of substrates may be utilized. Each surface prepared for a specific function may contain a number of sites, unique to its function, for photo-molecular attachment. These photo-chemical attachment species may be activated by photo-excitation from the illumination source. The substrate active sites may alter attachment probabilities of the molecular complexes that "make up" the photo-chemical species, which affects local work functions of the substrate and/or changes the polarization state of the substrate. In any case, a change in the photo-induced current collected or induced in the OSEE collection electrode system occurs in response to the illuminating radiation.

Figure 2:
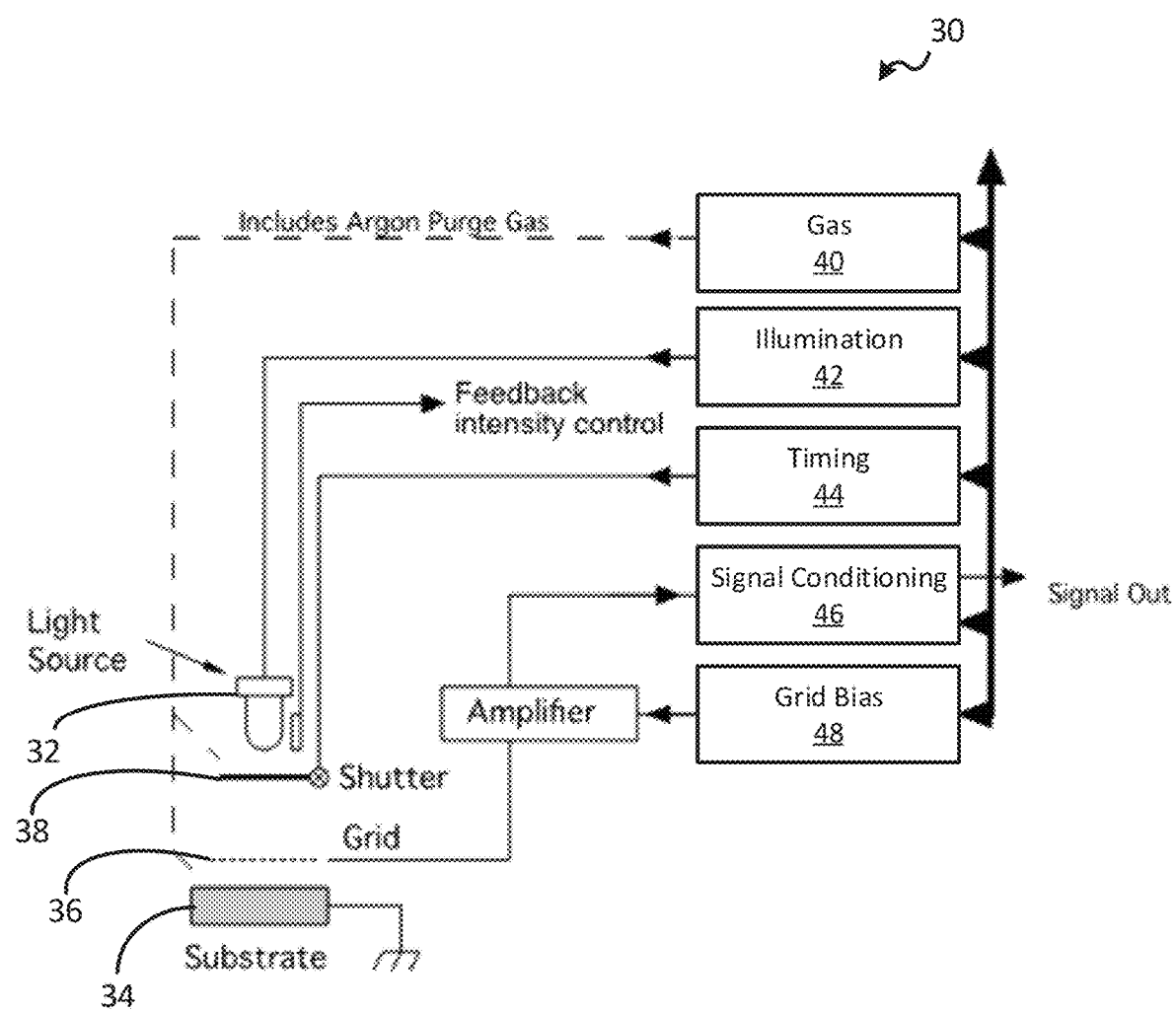
FIGS. 2-3 are schematic diagrams of illustrative instrumentation of a probe, apparatus, or device for OSEE measurement according to an embodiment.
Figure 3:
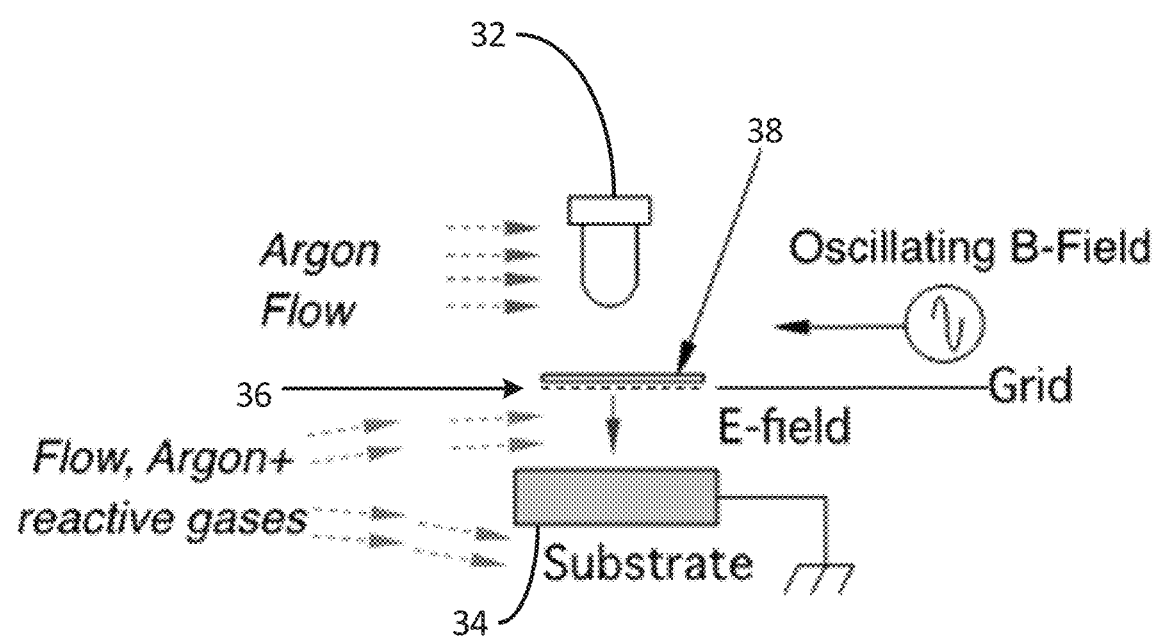

The probe instrumentation may include controls and algorithms to determine the structures on the substrate based on the received photocurrent as a function of time. Diagrams of the illustrative instrumentation is provided in FIGS. 2-3. As shown, the instrumentation may have a modular design and may be designed for flexibility for object shape and size. Each pod or probe may contain the elements depicted in FIGS. 2-3. FIG. 2 includes an OSEE pod or probe 30 within the instrument or system. FIG. 2 depicts the gas supply and control 40 including reactive gasses used in the process. The gas control module 40 may include several lines, including the purge lines, one of which assures Argon gas in the light source chamber. The illumination module 42 includes sources needed for excitation of photo-reactions in the adsorbate under study, as well as the photo-electron emission from the substrate. An intensity monitor, which may be used to assure constant intensity used for photo-emission studies from the substrate, may be included to monitor one or more intensities of key wavelengths. A low-frequency excitation source (e.g., MHz-GHz range-displaced upward in the diagram) is schematically shown in FIG. 3 as an oscillating magnetic field excitation source, where the oscillating magnetic field direction is parallel to the substrate. However, the Poynting Vector for such radiation has a component normal to the surface, except possibly for cavity-based radiation applications.

The illustrative methods, processes, and operations may involve illumination sources 32 capable of producing light of various wavelengths from the electromagnetic spectrum. Light provided by the illumination sources 32 may be a continuous spectrum with content in the visible region such as an arc or even a tungsten lamp. The illumination sources 32 may include, e.g., one or several laser emitters, light-emitting diode emitters, and/or a discharge tube or flash tube capable of producing multiple wavelengths. Light may be guided from the illumination sources 32 by light pipes conducting the radiation fluxes to the pods. The illuminations sources 32 may include a means of focusing the rays, e.g., a lens.

A charge collector or grid 36 (e.g., with a positive bias voltage relative to the substrate) may also be attached to the light pipe end. A shutter 38 may be included arranged between the light source 32 and the collector 36 operable to open and close to allow light emitted by the light source to impinge on the substrate 34. The light intensity may be actively controlled through a mechanism that that may include a feedback loop. In operation the system may be cycled through the following exemplary sequence of events:

i. Specimen may be prepared and placed in a chamber with a gas, which is inert to the process being measured. The specimen may be treated with heat and/or other techniques (a) to drive off any surface-residing molecules or other structures, which may interfere with the activity to be measured, and/or (b) to determine temperature coefficients as in Arrhenius-based analysis.

ii. A purge of the light chamber and surrounding measurement region may include the substrate surface. The light chamber is always purged with Argon or other gas to assure transmission. Depending on application, the purge mixture in the measurement region may be continuous during measurement.

iii. The illumination system may be activated and is verified to be consistently emitting in the intensity ranges at the wavelengths chosen for the application. This condition is maintained throughout the measurement operation and is executed by the system control.

iv. After a predetermined point in time, the shutter may be opened and the light may flood the measurement region, which includes a pre-selected and known area of the prepared specimen under study.

v. Emitted electrons and ions may be collected as a function of time, converted into a signal related to current, and may be converted, as needed, into charge number/time, or numerical current, where useful. The initial numerical current value is related to a numerical photon intensity striking the surface under examination immediately following the opening of the shutter. The time record following the opening is digitized, recorded and stored in memory for analysis for a time interval that includes sufficient time for the photo-related chemical reactions to occur. The appropriate quantities are calculated as needed, for, e.g. chemical identification and concentration.

vi. After a predetermined time, the shutter may be closed, and the measurement is completed. The length of time that the shutter is opened may depend on a number of factors, such as, e.g., the effects of the chemistry on the photoemission. This part of the mechanism may depend upon the photo-induced chemistry altering the localized work functions, and hence changes the efficiency of the photoelectric emission.

Another feature of this illustrative technology may be the spatial rearrangement of the pods to accommodate various geometries for inspections of different shaped parts. The pods may be arranged to accommodate the geometry of the part to be inspected as shown, for example, in the system 50 of FIG. 4. The system 50 includes pods 51a and 51b. Additional pods, e.g., pod 51b can be assigned to reference substrates, e.g. substrate 54b with known levels of reactants/adsorbents for differential readings. In another embodiment of this feature, the reference substrate/adsorbent/adsorbent level could be digitally stored in memory for differential comparisons.

To implement methods and processes discussed herein, the system 50 may include a controller 60 operably coupled to gas control 62, illumination control 64, clock and timing control 66, system instruments 68, signal conditioning 72, and power supplies 74. Controller 60 may include one or more processors 70. The controller 60 is further operably coupled to pods 51a and 51b to inspect surfaces.

Figure 4:
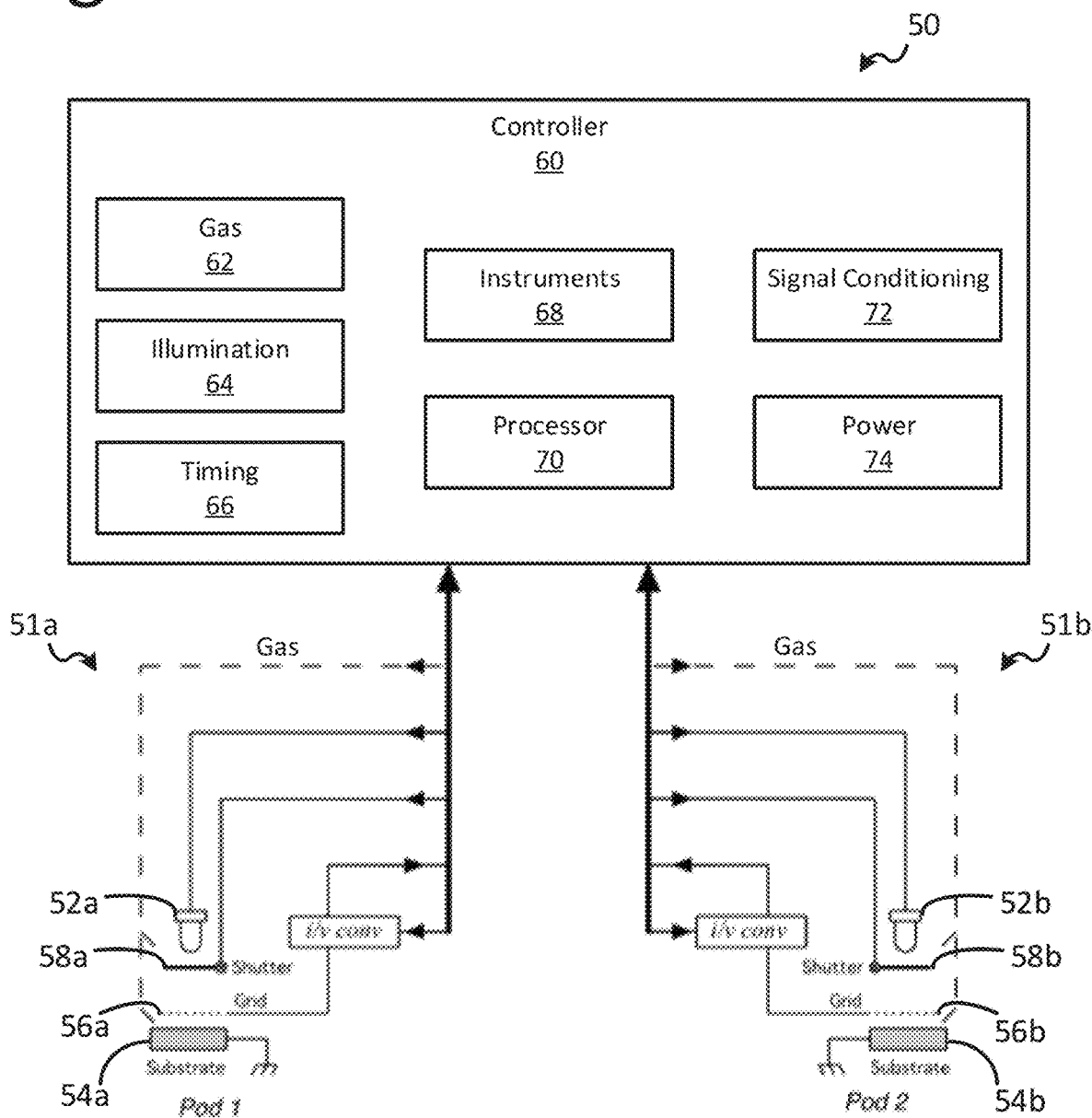
FIG. 4 is schematic illustration of a system including an exemplary system for OSEE measurement according to an embodiment.

The illustrative system of FIG. 4 includes an arrangement of a system 50 for differential comparison of two surfaces. For example, system 50 may include pod 51a can be set in one plane of a mating surface of a substrate 54a, and pod 51b can be set in a near-by plane, located in a different substrate 54b. Both substrates 54a and 54b can be scanned simultaneously for different response levels. In another application, the surface of substrate 54b may be a reference surface that can be simultaneously scanned with the surface of substrate 54a under examination. Differences between the two scanned surfaces of the two substrates 54a and 54b can be calculated and displayed to verify reactive activity. Another approach is to store a scan from a reference surface. A surface scan can be compared with the stored reference surface scan. Moreover, any surface scan can be compared with a later scan to verify any changes from other manipulations.

Non-planer electrode pods are also considered to obtain improved data collection around bolts and threaded joints as well as welded structures such as fillets and beam-forming procedures such as occurs in electron-beam formed and 3-D printed structures. These applications can be coaxial in structure with the light source axially aligned with the collector electrode. In other applications, the electron collector may be different shapes and arrangements to facilitate the geometry of the surface being inspected.

In another useful embodiment, pod 51a or 51b may be a pod in the shape of a circular footprint, where the ultraviolet (UV) radiation is carried through an optical fiber capable of transmitting a variety of photons (one or more of UV, visible, and infrared) from sources of appropriate wavelengths to, for example, excite substrate electrons with energies greater than the substrate's work function while also providing photons of the energy that may be used to provide excited states within affecting chemistry on the substrate. This radiation illuminates a small surface with an electrode arrangement to collect the consequent emission of photo-based charges. Such an arrangement may be capable of scanning regions of broken bonds to ascertain the chemistry around the broken areas.

The substrate (e.g., 54a and/or 54b), when photo-activated, may be selected for its sensitivity to a specific chemical reaction or reactions. Hence, the illustrative systems, apparatus, and methods may be described as being an analytical chemistry tool that involves surface effects of reactions. The mathematical model explores relationships among concentrations of photo-induced reactants. In other words, the illustrative systems, apparatus, and methods may determine the progression dynamics of a reactant (e.g., adsorbate) on a specified substrate and a reaction under examination. Further, the illustrative systems, apparatus, and methods may be configured to analyze how do these and other reactions progress as transitions between meta-stable states, caused by and energized by photo-excitation. Furthermore, the addition of coherent light sources (e.g., light sources 52a and/or 52b) may provide two-photon absorption processes for such examination.

Figure 5:
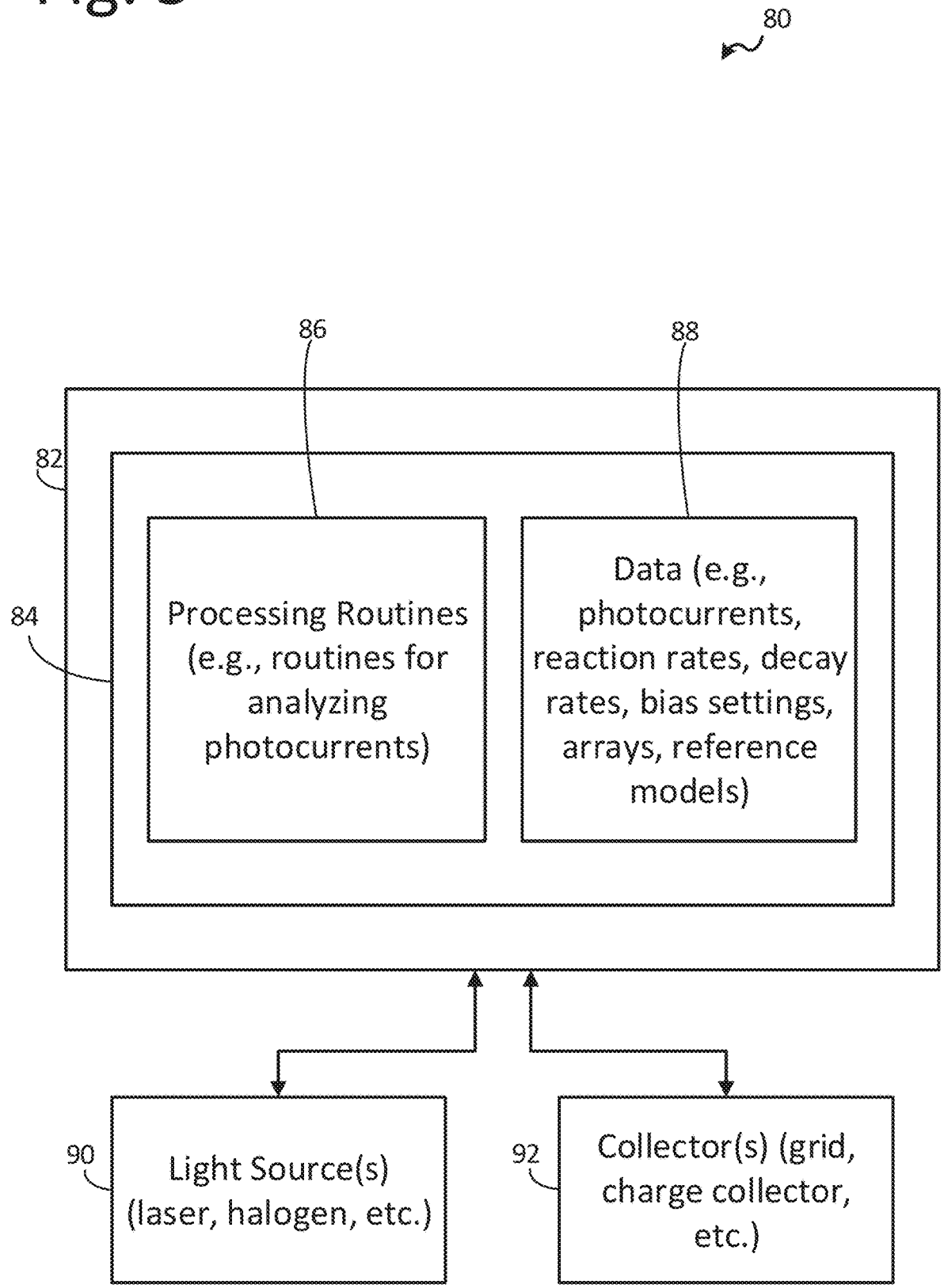
FIG. 5 illustrates an example time record of an optically stimulated electron emission (OSEE) measurement according to the various embodiments.

A functional block diagram of an exemplary apparatus 80 for use in inspecting chemical reactions of a surface as described herein is depicted in FIG. 5. The apparatus 80 may include a processing apparatus, or a processor, 82 and light source 90. Generally, the light source 90 may be operably coupled to the processing apparatus 82 and may include any one or more devices configured to emit light. For example, the light source 90 may include one or more lasers, filaments, light emitting diodes, etc.

Additionally, the light source 90 may be configured to emit light on a substrate. The light source 90 may be configured to emit light at frequencies that may cause the surface to emit photoelectrons in response to the light from the light source impinging on the surface. In one or more embodiments, the processing apparatus 82 causes the light source to emit light on a surface for inspection.

The apparatus 80 may additionally include a collector 92 operably coupled to the processing apparatus 82. Generally, the collector 92 may include any one or more devices configured to receive photoelectrons and provide a photocurrent based on the detected photoelectrons to the processing apparatus 82. The collector 92 may include any apparatus, structure, or devices configured to receive and/or photoelectrons and provide a photocurrent. For example, the collector 92 may include one or more grids, sensors, etc. The illustrative systems, apparatus, and methods described herein may include, or use, OSEE apparatus and sensors thereof described in U.S. Pat. No. 5,393,980 issued on Feb. 28, 1995 and entitled "Quality Monitor and Monitoring Technique Employing Optically Stimulated Electron Emmission (sic)," U.S. Pat. No. 6,856,403 B1 issued on Feb. 15, 2005 and entitled "Optically Stimulated Electron Emission Contamination Monitor and Method," and U.S. patent application Ser. No. 15/962,827 entitled "Optically Stimulated Electron Emission Apparatus" filed on Apr. 25, 2018, each of which is incorporated herein by reference in its entirety.

Additionally, the collector 92 may be electrically biased or offset by the processing apparatus 82. For example, the processing apparatus 82 may provide a bias or offset voltage to the collector 92. The bias or offset voltage may cause a photocurrent to be provided by the collector 92 to the processing apparatus 82 when photoelectrons are received by the collector. In one or more embodiments, the processing apparatus may be operably coupled to two or more light sources 90 and two or more collectors 92. In these embodiments, the system 80 may inspect multiple areas of the surface simultaneously or compare reactions of a test surface with a control surface.

The photocurrent provided received by the processing apparatus 82 may be configured to determine at least one chemical reaction of the surface. Processing apparatus 82 may analyze the photocurrent to determine a reaction rate, a reaction decay rate, photocurrent rate of change, kinetic constants of reaction, sequential reactions including atomic and molecular (quantum) rearrangements within activated surface states allowing sequential order and arrangement of intermediate surface states, or other reaction/photocurrent properties. The processing apparatus 82 may be configured to compare one or more of the photocurrent properties to known reactions to determine the at least one chemical reaction of the surface. In one or more embodiments, the processing apparatus 82 is configured to compare photocurrent properties of two or more photocurrents over the same time period to determine the at least one chemical reactions of the surface. In one or more embodiments, the processing apparatus 82 may be configured to determine a sequence of chemical reactions of the surface based on the received photocurrent.

Additionally, processing apparatus 82 may be configured to determine various properties or structures based on the determined at least one chemical reaction or sequence of chemical reactions. For example, processing apparatus 82 may be configured to determine a surface substructure, a pattern of molecules, a powder particle arrangement, an amount of catalyst, a chemical composition of a surface, a catalyst concentration gradient, substructure differences, molecular pattern differences, or other structures and properties of a surface based on the determined at least one chemical reaction or sequence of chemical reactions.

Further, the processing apparatus 82 includes data storage 84. Data storage 84 allows for access to processing programs or routines 86 and one or more other types of data 88 that may be employed to carry out the exemplary methods, processes, and algorithms of determining at least one chemical reaction of a surface. For example, processing programs or routines 86 may include programs or routines for performing computational mathematics, matrix mathematics, Fourier transforms, compression algorithms, calibration algorithms, inversion algorithms, signal processing algorithms, normalizing algorithms, deconvolution algorithms, averaging algorithms, standardization algorithms, comparison algorithms, vector mathematics, inspecting surfaces, gathering inspection data, detecting substructures, detecting molecular patterns of a surface, learning algorithms, biomimetic computation, autonomous navigation computation, or any other processing required to implement one or more embodiments as described herein.

Data 88 may include, for example, photocurrent reference data, known reaction constants (e.g., reaction rate, decay rate, etc.), positional data, arrays, meshes, grids, variables, counters, statistical estimations of accuracy of results, results from one or more processing programs or routines employed according to the disclosure herein (e.g., inspecting a surface), or any other data that may be necessary for carrying out the one or more processes or methods described herein.

In one or more embodiments, the apparatus 80 may be controlled using one or more computer programs executed on programmable computers, such as computers that include, for example, processing capabilities (e.g., microcontrollers, programmable logic devices, etc.), data storage (e.g., volatile or non-volatile memory and/or storage elements), input devices, and output devices. Program code and/or logic described herein may be applied to input data to perform functionality described herein and generate desired output information. The output information may be applied as input to one or more other devices and/or processes as described herein or as would be applied in a known fashion.

The programs used to implement the processes described herein may be provided using any programmable language, e.g., a high level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the apparatus 80 may be controlled using a computer readable storage medium, configured with a computer program, where the storage medium so configured causes the computer to operate in a specific and predefined manner to perform functions described herein.

The processing apparatus 82 may be, for example, any fixed or mobile computer system (e.g., a personal computer or minicomputer). The exact configuration of the computing apparatus is not limiting and essentially any device capable of providing suitable computing capabilities and control capabilities (e.g., control the movement of the apparatus 80, the acquisition of data, such as position or distance data) may be used. Further, various peripheral devices, such as a computer display, mouse, keyboard, memory, printer, scanner, etc. are contemplated to be used in combination with the processing apparatus 82. Further, in one or more embodiments, the data 88 (e.g., photocurrent over time data, reaction rates, decay rates, an array, a mesh, a high-resolution grid, a digital file, a file in user-readable format, positional data, etc.) may be analyzed by a user, used by another machine that provides output based thereon, etc. As described herein, a digital file may be any medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus 82 described herein. Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

In view of the above, it will be readily apparent that the functionality as described in one or more embodiments according to the present disclosure may be implemented in any manner as would be known to one skilled in the art. As such, the computer language, the computer system, or any other software/hardware that is to be used to implement the processes described herein shall not be limiting on the scope of the systems, processes or programs (e.g., the functionality provided by such systems, processes or programs) described herein.

The methods described in this disclosure, including those attributed to the systems, or various constituent components, may be implemented, at least in part, in hardware, software, firmware, or any combination thereof. For example, various aspects of the techniques may be implemented by the processing apparatus 82, which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary methods and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components or integrated within common or separate hardware or software components.

When implemented in software, the functionality ascribed to the systems, devices and methods described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus 82 to support one or more aspects of the functionality described in this disclosure.

Figure 6:
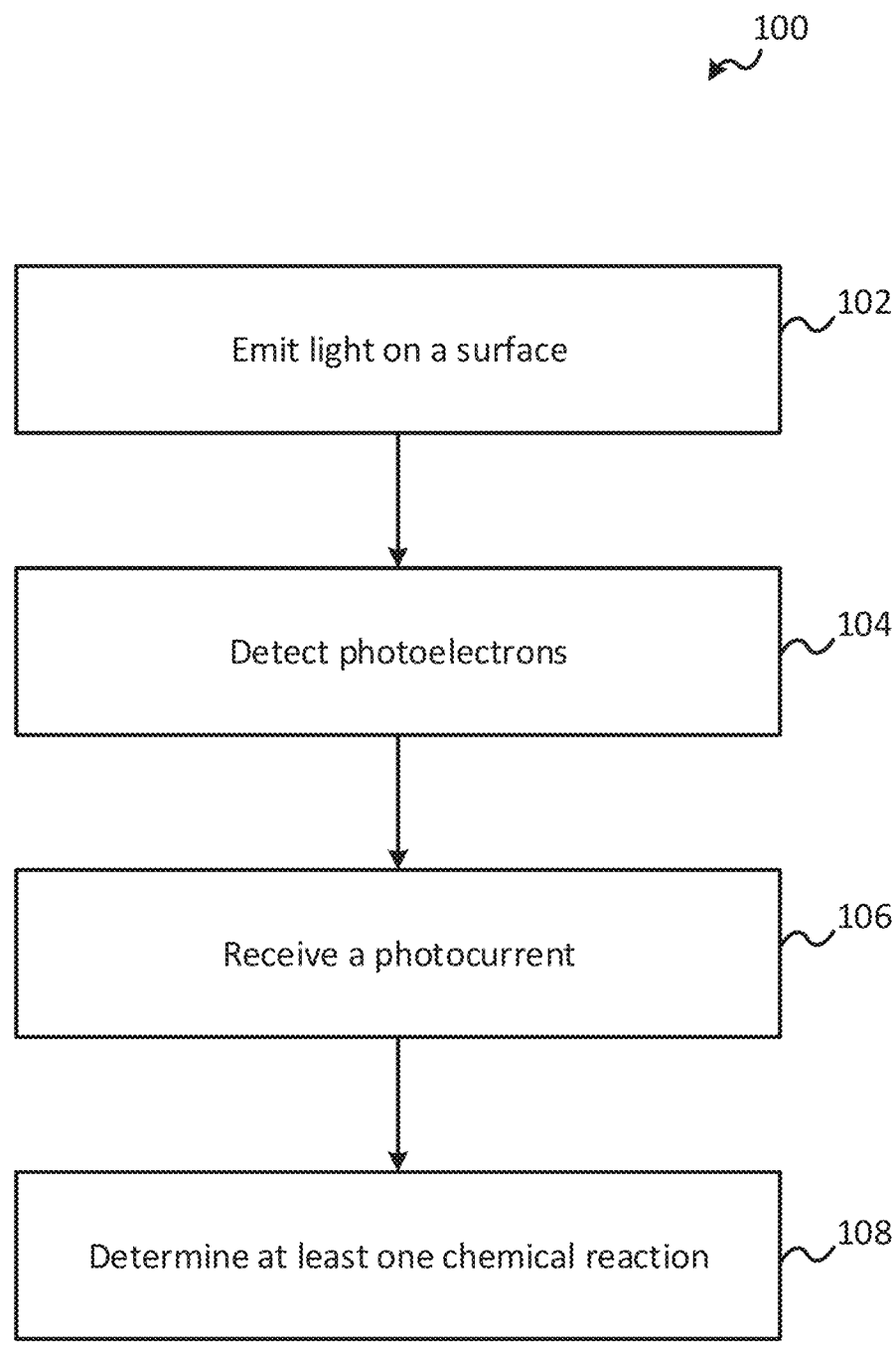
FIG. 6 is a schematic flow diagram of an illustrative method, or process, for determining at least one chemical reaction using an OSEE measurement probe or system according to an embodiment.

FIG. 6 is a flow diagram of an illustrative method, or process, 100 for inspecting a surface. The method 100 may include emitting light 102 on the surface using a light source. The light may be emitted using a laser, halogen lamp, etc. A frequency and intensity of the light may be such that the surface emits photoelectrons in response to the light impinging on the surface. The method 100 may further include detecting photoelectrons 104 emitted from the surface in response to the light from the light source impinging on the surface using a collector. The collector may include a grid, sensor, or other device to receive photoelectrons, and the collector may be biased by a controller as described herein. The method 100 may still further include receiving a photocurrent 106 from the collector. The photocurrent provided by the collector may be based on the photoelectrons received or detected by the collector. The method 100 may finally include determining at least one chemical reaction 108 of the surface based on the received photocurrent. In one embodiment, determining at least one chemical reaction 108 may include determining a chemical reaction sequence of the surface.

In one or more embodiments, the method 100 may include determining a surface substructure, a pattern of molecules, a powder particle arrangement, an amount of catalyst, a chemical composition of a surface, a catalyst concentration gradient, substructure differences, molecular pattern differences, or other structures and properties of a surface based on the determined at least one chemical reaction or sequence of chemical reactions.

Figure 7:
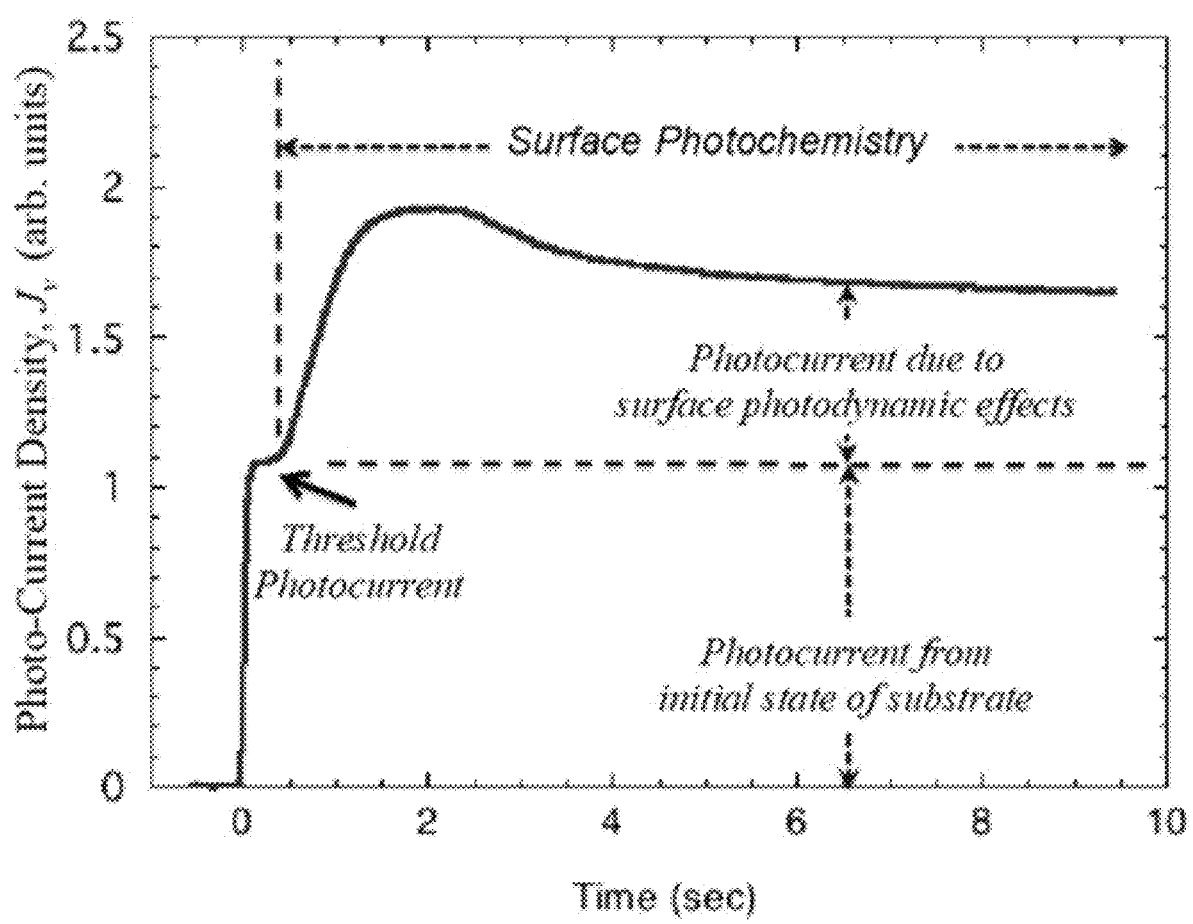
FIG. 7 illustrates an example photocurrent as a function of time.

As an illustration, a case where such photo-induced reactions on a substrate "play a role" in the photo-current is examined. An illustrative analytical model is described herein to account for the observed data. First, an examination of the photo-current as a function of time, as shown in FIG. 7, is utilized. Then, the model proceeds with the first principle derivations of the concentrations of meta-stable states as they unfold in time. This derivation includes the addition of Fourier-based mathematical equations to aid in data analysis that includes emphasis on rate constants, decay coefficients, and patterns related to them. Then, an example is taken, and some possible conclusions based on the analysis and data taken with a unit consistent with the design parameters of this instrument with a mercury vapor discharge tube as the photon source are described.

The photo-current density, $J_v$ as a function of time for a carbon fiber reinforced polymer (CFRP) adsorbent, stored in room atmosphere prior to measurement is depicted in FIG. 7. In this case, the measurement chamber is flushed with argon gas for 10 seconds prior to illumination exposure. The illumination exposure begins with the opening of the shutter at t=0. The current rises to a threshold value, which occurs before the surface photo-related reactions (labeled as surface photochemistry in the diagram) begin. Within several hundred milliseconds, $J_v$ begins to rise to a maximum value in approximately 1.50 seconds. In about 2.5 seconds, $J_v$ begins a monotonic descent to the end of the graph.

In other words, time dependence of photocurrent, i, from a contaminated CFRP adsorbent is shown in FIG. 7. The threshold photocurrent as marked in the graph, is the initial value of the photoelectron current before surface photochemical reactions effects.

As the process continues, the reaction to the illumination may cascade through many different forms, such as changes in attachment patterns, and/or the attachment energy. Whatever series of reactions occur, each photo-reaction dynamic, according to the first law of photochemistry, has a kinetic expression, which is assumed to be a second-order reaction where the (numerical) photon current density (# of photons/area striking the surface in one second), $j_v$, is held constant. This form is consistent with the energetics of photon absorption by an adsorbate species, and the lifetime of the excited state, where k is related to the lifetime of the excited state.

$$[A_n] + j_v \xrightarrow{k v n} [A_n^*]_v \quad (1)$$

This represents the general case, where the reaction rate statement is schematically represented by each individual reaction as $$\frac{d\ln[A_n^*]_\nu}{dt} = -j_\nu k_{\nu n} \quad (2)$$

$$\sum_n \frac{d\ln[A_n^*]_\nu}{dt} = -j_\nu \sum_n k_{\nu n}$$

The sum of the reaction constants may be represented as $$k_\nu(t) = \sum_n k_{\nu n} \quad (3)$$

where $k_\nu(t)$ represents the sum over the many contributions from the different possible series.

The series may include different contaminant sources, as well as cascade series, where a single component undergoes multiple sequential transformations. These may include an excited state decaying to multiple states, each with a different kinetic constant, k.

The threshold photocurrent, shown in FIG. 7, marks the beginning of the activation process. For illustrative purposes in other applications, the component of the current from the activation processes may be written as:

$$J_{[A^*]}(t) = J(t) - J_{threshold} \quad (4)$$

At time t, $$\delta Q_{[A^*]}(t) = [A^*](t) j_\nu h \nu S \langle C_\nu \rangle (\varepsilon_m - \varphi) \delta t \quad (5)$$

where $\langle C_\nu \rangle$ is a constant of proportionality, $\varepsilon_m$ is the maximum available kinetic energy of the emitted electron, which is $h\nu - \phi$, where $\phi$ is the work function of the substrate. $\varphi$ is the contact potential between the clean substrate and the substrate saturated with the adsorbate. Dividing by $S\delta t$ and specializing to the $n^{th}$ reaction, the following is provided:

$$J_{[A_n^*]}(t) = [A_n^*](t) j_\nu h \nu S \langle C_\nu \rangle (\varepsilon_m - \varphi_n) \quad (6)$$

leading that for all n, to the statement of equivalence $$\frac{dJ_{[A_n^*]}}{J_{[A_n^*]}} = \frac{d[A_n^*]_\nu}{[A_n^*]_\nu} \quad (7)$$

and hence, from Equation (2), $$\frac{d\ln J_{[A_n^*]}}{dt} = -k_{\nu n} j_\nu \quad (8)$$

where Equations 7 and 8 are key to the assertion of equivalence that relates the behavior of the photo-current density to the kinetic constant, k.

During the measurement process, the parameters (area, light intensity, electric field) are held fixed across the footprint. It is assumed that the current density J is uniform across instrument's footprint area S. Equations (2) and (8) give the expression for the reaction constant, $$k_\nu(t) = -\frac{1}{j_\nu} \frac{d\ln J(t)}{dt} = -\frac{1}{j_\nu} \frac{d\ln i(t)}{dt} \quad (9)$$

where i is the photoelectron current from the substrate. Hence, by measuring the photocurrent with time, the reaction rate, $k_\nu(t)$, may be deduced.

Based on an analytical study to illustrate, from first principles, that a series of metastable states brought on by photo-excitation, may be developed in a sequential order in time. Each metastable state in the sequence has a different reaction with the substrate, which may result in a change in efficiency of electron emission from the substrate. Expressions for the concentrations of each metastable state in the sequence may be derived as shown herein. The expressions for the decay constants associated with the metastable states are further shown, and the relation to the constants to the Fourier transform of the time record are described. Finally, these tools are used on an example to demonstrate how the analysis works to identify characteristics of the states on the substrate. The state on a substrate including physical and/or chemical attachments of adsorbate bonds to the substrate is identified. It is this mechanism that couples the photocurrent with the concentrations [A*] and the sequential reactions that follow.

Beginning with the case of a progenerator species, assumed to be a photoreactant of concentration [$A_0$] that is photo-excited with photons of frequency, $\nu$, to sequentially produce generations of excited metastable states, where each generation spawns the next generation. The beginning of the process occurs at the instant when the adsorbate is exposed to excitation illumination. Starting with Equation (1), with the initial conditions when the photoexcitation process begins, and at that instant [$A_0^*$]=0 and [$A_0$]=[$A_0$]$_{init}$ when t=0.

$$[A_0] + j_{0\nu} \xrightarrow{k_0} [A_0^*] \quad (10)$$

where $k_0$ is the reaction constant.

Starting with the process of adsorbate excitation and assuming that the photon flux from the illumination source is constant in time. Initially the generation of excited states is proportional to the product of [$A_0$] and the photon flux causing the transition. Equation (2) becomes $$\frac{d[A_0^*]}{dt} = Pj_\nu[A_0] - j_\nu k_0[A_0^*] \quad (11)$$

where P is a conversion rate constant of proportionality. If [$A_0$] is a constant=[$A_0$]$_{init}$, and if [$A_0^*$]=0 when t=0 then $$[A_0^*] = \frac{P[A_0]_{init}}{k_0}\left(1 - e^{-j_\nu k_0 t}\right) \quad (12)$$

The Fourier Transform for the function is determined by the similarity theorem of the basic form to

$$\Im\left(1 - e^{-j_\nu k_0 t}\right) = \frac{\delta(f)}{2} - \frac{(j_\nu k_0)^2}{2\pi f}\frac{1}{\sqrt{(j_\nu k_0)^2 + 4\pi^2 f^2}}e^{-iArctan\frac{(j_\nu k_0)}{2\pi f}} \quad (13)$$

Figure 8:
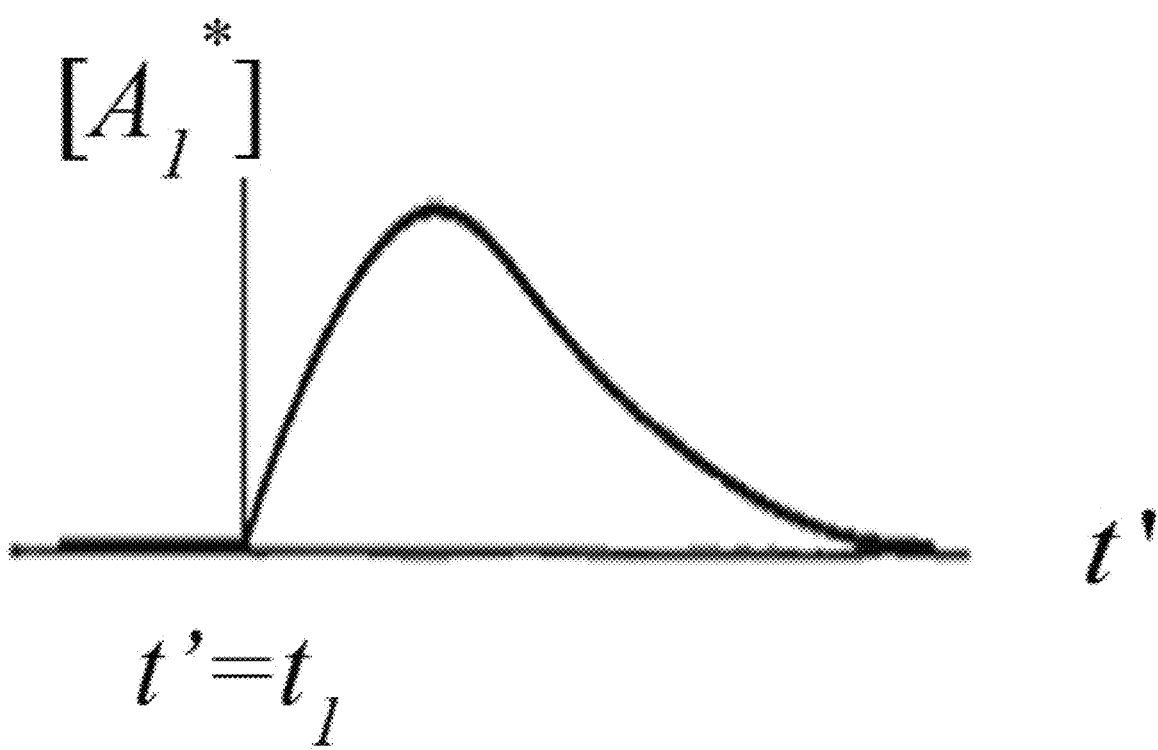
FIG. 8 illustrates a convolution that represents the generation and decay of a reaction.

Next, the first metastable transition of $[A_0^*]$ to $[A_1^*]$ may be considered, the first reaction in the sequence;

$$[A_0^*] + j_{0v} \xrightarrow{k_1} [A_1^*] + j_{1v} \xrightarrow{k_2} [A_2^*] \ldots$$

with the differential equation $$\frac{d[A_1^*]}{dt} = \left|\frac{d[A_0^*]}{dt}\right| - j_{1v}k_1[A_1^*] \quad (14)$$

$$\frac{d[A_1^*]}{dt} = j_{0v}k_0[A_0^*] - j_{v}k_1[A_1^*]$$

where the absolute signs around the first term on the LHS of the equation represents a source term. Substituting in results from Equation (12) and solving the equation provides $$[A_1^*] = [A_0]_{init} \frac{j_{0v}k_0}{j_{1v}k_1 - j_{0v}k_0} \left(e^{-j_{0v}k_0 t} - e^{-j_{1v}k_1 t}\right) \quad (15)$$

as the convolution that represents the generation and the decay of $[A_1^*]$ from the precursor state, $[A_0^*]$, as illustrated in FIG. 8.

In response to $[A_1^*]$, $$\sum_{states} k_{1v} = -\frac{1}{j_{1v}} \frac{d\ln i(t)}{dt} = \Lambda_{\chi v}[A_0]_{init}\left(e^{-j_{0v}k_0 t} - e^{-j_{1v}k_1 t}\right) \quad (16)$$

where $\Lambda_{\chi v}$ is a constant, and $[A_0]_{init}$. The profile of $[A_1^*]$ in time is depicted in FIG. 8. The profile shown is typical of the segments in each transition to the next adjacent state The Fourier representation of Equation (16) is the convolution of $$k(t)_{[A_1^*]} = \left\{\frac{d\ln i(t)}{dt}\right\}_{[A_1^*]} \sim \left(\frac{e^{-j_{0v}k_0 t} - e^{-j_{1v}k_1 t}}{j_{1v}k_1 - j_{0v}k_0}\right) \quad (17)$$

The Fourier Transform, $\mathfrak{F}$ of Equation (16) is determined by the products of the functions involved in the convolution.

$$K(2\pi f)_{[A_1^*]} = \quad (18)$$

$$\mathfrak{F}\left\{\frac{d\ln i(t)}{dt}\right\}_{[A_1^*]} \sim \left(\frac{1}{\sqrt{\alpha^2 + 4\pi^2(f-f_0)^2}}\right)\left(\frac{1}{\sqrt{\beta^2 + 4\pi^2(f-f_0)^2}}\right)$$

where $\alpha$ and $\beta$ are the decay constants $j_{0v}k_0$ and $j_{1v}k_1$ respectively. This gives a Full Width-Half Maximum (FWHM or $2\Gamma$) of $K(2\pi f_0)_{[A_1]}$ $$\Gamma = \pm\frac{\sqrt[4]{3}}{2\pi}\sqrt{\alpha\beta} \quad (19)$$

To illustrate the effects, the first several generations, $[A_1^*]$, $[A_2^*]$, and $[A_3^*]$ are described. In this series of experiments and investigations, the effects of multiple transitions within the mercury spectrum were not considered. The assumption that a different frequency photon flux is involved in each of the sequence members may not be necessary but is chosen for generality.

Consistent with Equation (1), the photon flux for each reaction may come from different wavelengths (in this example, different transitions in the mercury spectrum light source). For simplicity, however, only one photon flux is assumed to be involved with each reaction, and the kinetics expression may be written as $$[A_1] + j_{1v} \xrightarrow{k_1} [A_2^*] + j_{2v} \xrightarrow{k_2} [A_3^*] \quad (20)$$

Starting with Equation (2), the following is provided $$\frac{d[A_2^*]}{dt} = j_{1v}k_1[A_1^*] - j_{2v}k_2[A_2^*] \quad (21)$$

and $$\frac{d[A_3^*]}{dt} = j_{2v}k_2[A_2^*] - j_{3v}k_3[A_3^*]$$

When t=0, $[A_1^*]$ and $[A_2^*]$=0. The solutions as:

$$[A_2^*] = [A_1^*]_0 H(t-t_2)\left(\frac{j_{1v}k_1}{j_{2v}k_2 - j_{1v}k_1}\right)\left(e^{-j_{1v}k_1(t-t_2)} - e^{-j_{2v}k_2(t-t_2)}\right) \quad (22)$$

as the convolution that represents the generation and decay of $[A_2^*]$ from the precursor state, $[A_1^*]$, as illustrated in FIG. 8. $H(t-t_2)$ is the Heaviside Function, and $k_1$, $k_2$ and $j_{1v}, j_{2v}$ are the respective reaction rate constants and photon fluxes. The time is aligned with the beginning of generation of $[A_2^*]$, t=$t_2$.

It is instructive to note that the asymptotic behavior of Equation (16) is determined by the second term in the last factor. This may also be apparent in FIG. 8, where the curve approaches the asymptote as t' becomes large. This asymptote contains the effects of the decay constant associated with the time dynamics associated with $[A_2^*]$ as it transitions to another state.

The next state is written below $$[A_3^*] = [A_1^*]_0 \begin{pmatrix} \frac{j_{1v}k_1}{j_{3v}k_3 - j_{1v}k_1}\frac{j_{2v}k_2}{j_{2v}k_2 - j_{1v}k_1}e^{-j_{1v}k_1 t} + \\ \frac{j_{1v}k_1}{j_{1v}k_1 - j_{2v}k_2}\frac{j_{2v}k_2}{j_{3v}k_3 - j_{2v}k_2}e^{-j_{2v}k_2 t} + \\ \frac{j_{1v}k_1}{j_{1v}k_1 - j_{3v}k_3}\frac{j_{2v}k_2}{j_{2v}k_2 - j_{3v}k_3}e^{-j_{v}k_3 t} \end{pmatrix} \quad (23)$$

The general case where a photoexcitation, v, produces a series of relatively short-lived states may be considered, and where a typical reactive state density, $[A_M]$, depends on the previous generation of states, $[A_i]$; i is less than M. An example may be a reaction series such as, $3O_2 + 3hv_1 \rightarrow 2O_{3+} 2hv_2 \rightarrow 2O + 2O_2$. In this treatment, the branching or degeneracies may be neglected, and the basic action of the $\zeta^{th}$ member of the sequence may be considered.

$$\frac{d[A_\zeta]}{dt} = j_{[\zeta-1]v}k_{\zeta-1}[A_{\zeta-1}] - j_{\zeta v}k_\zeta[A_\zeta] \quad (24)$$

After some serious algebra, the following is obtained:

$$[A_\varsigma] = [A_0](\xi_1 e^{-j\nu k_1 t} + \xi_2 e^{-j\nu k_2 t} + \ldots \xi_\varsigma e^{-j\nu k_\varsigma t}) \qquad (25)$$

where $$\xi_1 = \frac{k_1}{k_\varsigma - k_1} \frac{k_2}{k_2 - k_1} \frac{k_3}{k_3 - k_1} \cdots \frac{k_{\varsigma-1}}{k_{\varsigma-1} - k_1} \qquad (26)$$

$$\xi_2 = \frac{k_1}{k_1 - k_2} \frac{k_2}{k_\varsigma - k_2} \frac{k_3}{k_3 - k_2} \cdots \frac{k_{\varsigma-1}}{k_{\varsigma-1} - k_2}$$

...

$$\xi_{\varsigma-1} = \frac{k_1}{k_1 - k_{\varsigma-1}} \frac{k_2}{k_2 - k_{\varsigma-1}} \frac{k_3}{k_3 - k_{\varsigma-1}} \cdots \frac{k_{\varsigma-1}}{k_\varsigma - k_{\varsigma-1}}$$

$$\xi_\varsigma = \frac{k_1}{k_1 - k_\varsigma} \frac{k_2}{k_2 - k_\varsigma} \frac{k_3}{k_3 - k_\varsigma} \cdots \frac{k_{\varsigma-1}}{k_{\varsigma-1} - k_\varsigma}$$

with the proviso that $$\sum_{i=1}^{\varsigma} \xi_i = 0 \qquad (27)$$

Thus, the general case is determined.

The general case may allow the identification of elements of algorithms used for calculation of kinetic constants associated with the various sequential reactions of the specimen under examination. These coupled with the Fourier analysis may provide, or give, the tools used in interpretation of results obtained from these measurements.

Since <d(lni)/dt> is proportional to $k_\nu(t)$, Eq. (9) may be examined from the viewpoint of reaction speed of each state. Each reaction in the sequence may be isolated by modelling the decay portion of the state under examination. One expects each reaction sequence to have a specific frequency that depends upon its decay constant, s. Hence a time record will have all sequence members with their differing frequencies. Observing the fit of the undulations to a general shape (e.g., the undulations were matched to the general form $y = e^{-bt}$, and the Fourier Transform may be calculated from this form. Then J vs. t plots were Fourier analyzed with MATLAB. The plots were fitted to data in the undulations, and plotted with Kaleidagraph routines) for the $i^{th}$ reaction in the sequence, occurring at $t=t_0$, that is modelled as $$k_\nu(t) \Box \frac{d \ln i(t)}{dt} = AH(t - t_0) e^{-s(t-t_0)} \qquad (28)$$

where s is the decay constant. This form is consistent with the decay of excited states where the rate of decay is proportional to its lifetime. Its Fourier transform is $$K(2\pi f) \Box \mathfrak{T}\left\{ \frac{d \ln i(t)}{dt} \right\} = e^{-2\pi i f t_0} \frac{\sqrt{s^2 + (2\pi[f - f_0])^2}}{s^2 + (2\pi[f - f_0])^2} \qquad (29)$$

Figure 9:
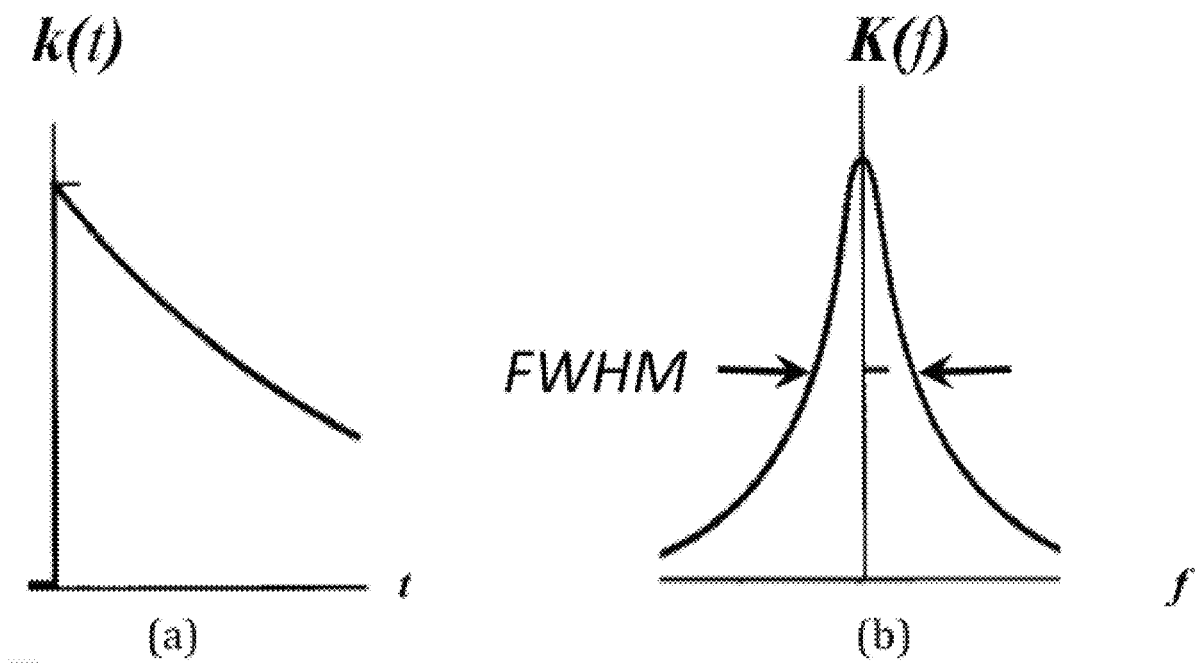
FIG. 9 illustrates the general shapes of Equations (28) and (29).

The general shapes of Equations (28) and (29) is depicted in FIG. 9. More specifically, Fourier Analysis of the basic components of <d(lni/dt)> in the time domain (a) and in the frequency domain (b) is depicted in FIG. 9.

Equation (29) may be rewritten as:

$$K(2\pi[f - f_0]) \Box e^{-2\pi i f t_0} \frac{1}{\sqrt{s^2 + (2\pi[f - f_0])^2}} \qquad (30)$$

and examine the amplitude component around the point $f_0$. The maximum of K, which occurs at K=1/s occurs when $f=f_0$. A value of $\Gamma=\pm[f-f_0]$ when K=0.5 s may then be calculated, which gives $$\Gamma = \frac{\sqrt{3}}{2\pi} s \qquad (31)$$

By use of Equation (31), the FWHM values may be calculated for a data set taken on a carbon substrate.

For the purposes of isolating the effects from molecular excitations, the general form for excitation of specimen components by structural adsorption on the substrate has been modeled. The fact that each state consists of a rapid initial rise of an excited metastable state, followed by an exponential decay of that state, may be considered. The characteristics may be determined by the energy considerations of excitation followed by decay of excited states and associated surface dynamics. the analysis to photo-excitation of adsorbates on the substrate may be applied with the understanding that, for the $N^{th}$ reaction of species $A_n$, $k_n^N(t)$ represents the activity: the larger $k_n^N(t)$ the more quickly $[A_n^N]$ transitions to $[A_n^{N+1}]$. The evaluations of K(f) gives transition time information, in that the full width at half maximum values of the curves, 2Γ, are related to the lifetime of the transitions, where each transition is represented by each of the curve segments. This analysis may thus establish a record of photo-based reactions that gives insights into the metastable states involved in the surface reactions (e.g., chemical reactions, physical reactions, etc.) involving photo-reactants with surfaces.

As a demonstration of application, data collected on a photo-excited surface with a variety of photo-reactants on a carbon fiber reinforced composite material, as might be found in fuselage construction on an aircraft, is shown. The reactants include a release agent, oxygen, water vapor, other hydrocarbons left over from cleaning procedures.

Figure 10:
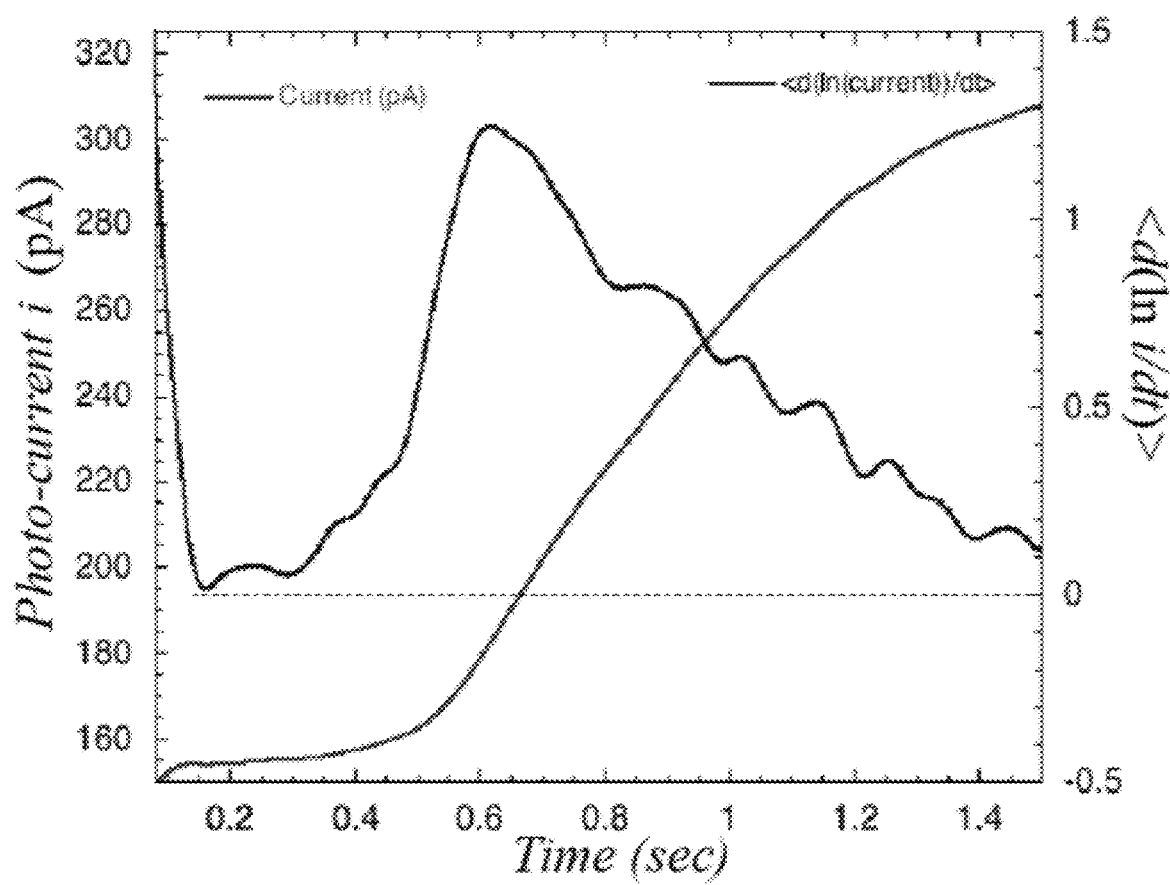
FIG. 10 illustrates a measured photocurrent and corresponding reaction rate.

Plots of photo-current (in green, left ordinate) and derivative of logarithm of photocurrent (in blue, right ordinate), with time as the abscissa. k(t) is proportional to d(lni/dt) are shown in FIG. 10. The structure represents the various metastable excited states brought on by photo-excitation.

After an initial transient response associated with the shutter opening, <d(lni)/dt> and hence k starts close to zero, as indicated by the proximity of the minimum of the blue line to the null line on the right ordinate. As time progresses, an undulation structure superposed on the general trend is noted (first increasing, and then gradually decreasing), which begins at approximately 0.2 sec, and continues throughout the plot. In general, <d(lni)/dt> rises to a maximum during the initial 550 msec, and then drops as time increases. As <d(lni)/dt> begins to decrease, the data may be examined in more detail. The rise is consistent with the absorption of photons by atoms/structures in the adsorbate [A*]. As $[A_n]$ transforms into $[A_n*]$ $\varphi_n$ changes, and thus changes i such that it tracks the effect of the transformation on <d(lni)/dt>, as it rises to maximum, <d(lni)/dt>$_{max}$, and then decreases, which takes place from ~550 msec to approximately 1500 msec.

Figure 11:
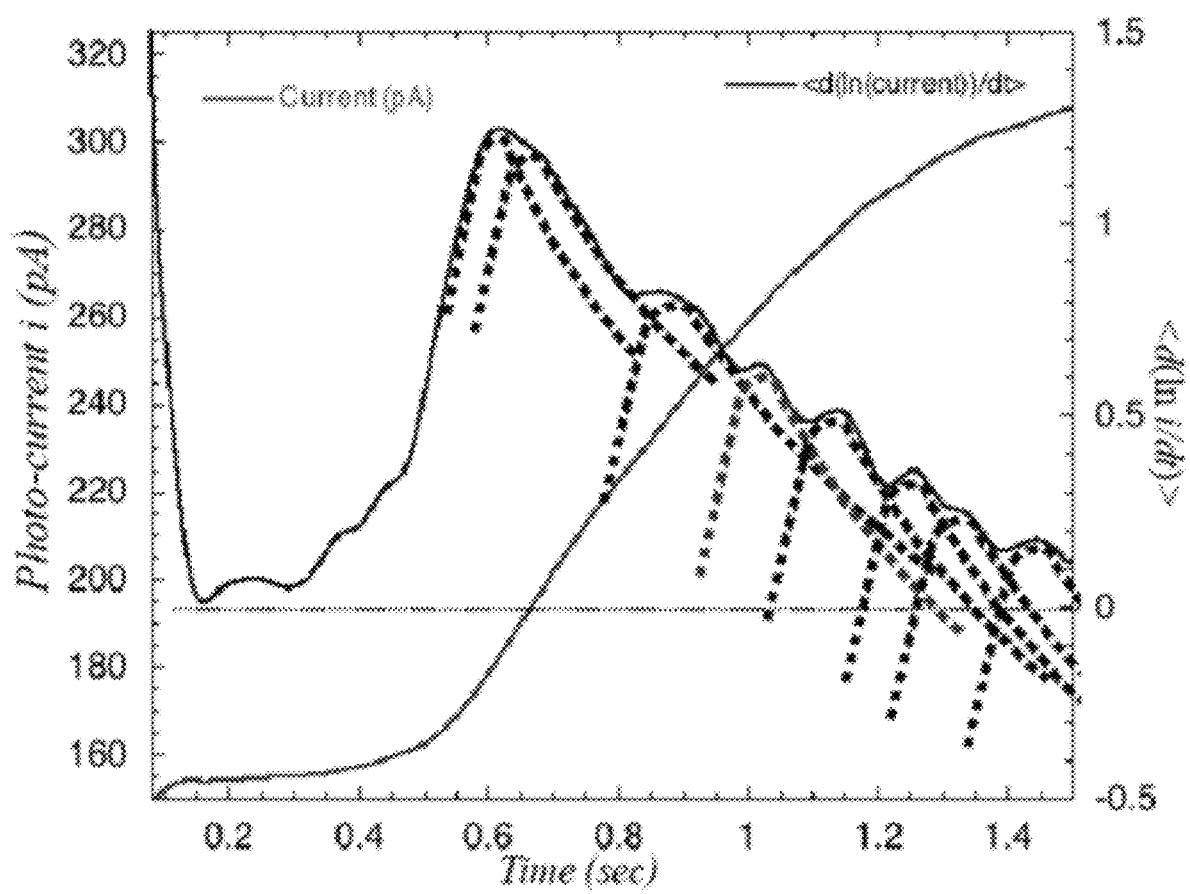
FIG. 11 illustrates a decay of each reaction sequence member being matched with its exponential decay function.
Figure 12:
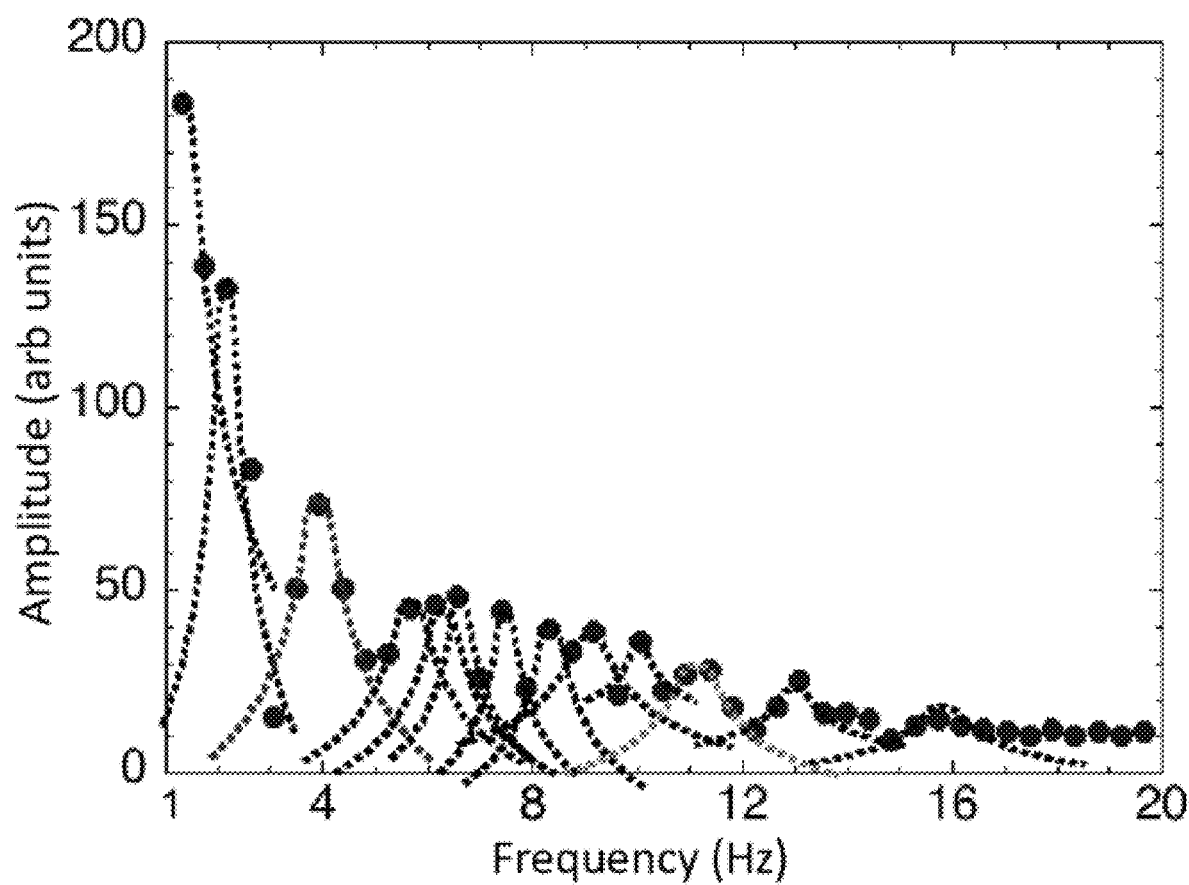
FIG. 12 illustrates a numerical Fourier transform on the numerical time record of the reaction rate from FIG. 7.

As mentioned earlier, the asymptotic behavior of a sequence member (e.g. the last term in the last factor of Equation (22)) may be determined by the second term in the last factor, which may be apparent in FIG. 8, where the curve approaches the asymptote as t' becomes large. This asymptote contains the effects of the decay constant associated with the time dynamics associated with [$A_2^*$] as it transitions to another state. This may be demonstrated by approximating the appropriate curve segment with an exponential decay function, $e^{-st'}$, as shown in FIG. 11. The decay of each sequence member may be matched with its exponential decay function and shown in FIG. 11.

A match of k(t) to the slope variations of the plot shown in local relative slope variations of the example d(lni/dt) is shown in FIG. 11. The slope of each local element of the graph is matched with the k(t) shown in FIG. 9a. The slopes of the waveform are aligned to match with the actual curve in each of the selected elements.

A numerical Fourier transform algorithm using a MATLAB package was performed on the time record of <d(lni)/dt> in FIG. 7. A plot of the transform results is shown in FIG. 9, where the amplitude is in arbitrary units. The data points are results from the algorithm. The dotted lines are scalings of the function shown in FIG. 9a. Two typical plots are in red (centered around 4 Hz.), and dark yellow (centered around 10 Hz.) The frequency plot was truncated because of the instrument's characteristics, which included a frequency cut-off in the 20 to 30 Hz range, and low-frequency (below 1 Hz.). As expected, the largest amplitudes, which represent the curve's dominant shape, are in the low frequency range (1 to 2 Hz.).

In the intermediate frequency range, an increase in transitions per hertz may be noted. From 5 Hz to 7 Hz, the transitions appear close together. Below 5 Hz and above 7 Hz, the plot's separation of transitions appears to be representative of frequency-domain components shown in FIG. 9b, but with lower amplitudes (strengths) and larger Γ (2Γ is the full width, half maximum for each curve). From Equation (17), the state's associated decay constant, s, may be calculated.

K(f) from a carbon adsorbent, cleaned and vapor degreased with ethanol. Two of the component K(f)(4 Hz in red, 11 Hz in orange) show differences in the fittings of the individual frequency signatures in FIG. 9b.

The analysis from this method on the example illustrates the separation of the sequential photo-reactions by the respective kinetic constants. The results are summarized in Table 1.

Table 1 is a compilation of characteristics for each component in K(f), organized and listed under each segment, listed from low-frequency of 1.2 Hz to a maximum of 16 Hz (first row). As the frequency increases, the amplitudes decrease. The characteristics of the decrement of each component are shown in the full width at half maximum measurements. These are shown in the 2Γ values (second row). Also included in the table are the values of the decay constant, s (third row), and the relative strength, uncorrected for instrument's frequency response (fourth row).

In the analysis of Fourier Transform, K(f) of k(t), two to three dominant low frequency components (below 4 Hz) are present. This series represents the highest strengths, with segment 1 being the largest. It is interesting to note that within measurement uncertainty each 2Γ is an integer or half-integer multiple of a basic 2Γ=0.37 Hz. It may be noted that one component (Segment #8) appears to have an anomalous value for 2Γ=0.37 Hz.

The analysis shows that the FWHM measured at the center frequency $f_0$ is directly connected with the decay constant s associated with each sequential member. Each undulation represents a different state. The existence of these states may, therefore, indicate a pattern of photo-excited sequential transformations [$A_i$], in the adsorbate concentration and/or a reaction of a species with other adsorbates on the substrate.

Further, this analysis within this illustrative example may be designed to demonstrate how this may be used to outline and explain results and should not be considered as limitations. Other analyses, rearrangements, and modifications obvious to the practitioner and based on this work, are also within the scope of this invention.

In one or more embodiments, the systems, apparatus, and methods may include, or utilize, an instrument that uses single or multiple coherent light sources, examples being diode-emitting sources, (e.g., laser emitting sources) with emission frequencies chosen to optimize response to specific adsorbates and substrates of interest. Further, it also provides for radio- to microwave frequency excitation of states in an effort to excite adsorbate attachment energies. Special design probes, appended to this document, permit use with unique applications for the study and characterization of chemical and biological specimens.

The instrument may also incorporate lock-in dynamics that permit an intensity modulation to test for contaminant interactions that aid in identification of interacting species. Such applications can use lock in amplifier techniques to follow and interpret the modulations for weak processes,

TABLE 1

Segment analysis of graph of K(f) made from data taken on a carbon substrate. Row 1: The segment number identifies the segment selected for the analysis. Row 2: The frequency is the center frequency of each segment. Row 3: 2Γ is the measure of the full width at half maximum of each segment. The $2Γ_0$ Multiple is the step multiple of 0.37 Hz. Row 4: the decay constant s, obtained by Equation (31). Row 5: The relative strength of each segment.

| | Segment Number | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Frequency (Hz) | 1.2 | 2.1 | 4 | 5.6 | 6.2 | 6.5 | 7.2 | 8.5 | 9 | 10 | 11.2 | 13 | 16 |
| 2Γ (Hz) | 1.47 | 0.73 | 1.17 | 1.47 | 1.17 | 1.17 | 0.73 | 1.03 | 1.9 | 2.35 | 1.47 | 1.61 | 2.35 |
| $2Γ_0$ Multiple | 4 | 2 | 3 | 4 | 3 | 3 | 2 | — | 5 | 6.5 | 4 | 4.5 | 6.5 |
| Decay Constant (1/sec) | 2.6 | 1.3 | 2.1 | 2.6 | 2.1 | 2.1 | 1.3 | 1.9 | 3.5 | 4.3 | 2.6 | 2.9 | 4.2 |
| Strength | 88 | 63 | 35 | 22 | 20.5 | 22.5 | 21 | 19 | 18.5 | 17.5 | 13 | 12 | 7 | such as 2-photon absorption processes. Additionally, the illustrative systems, apparatus, and methods can utilize interaction dynamics that photo-induced stresses in contaminants that lead to photo-acoustic signatures that can be picked up with simple low-frequency circuitry and sensors designed for audio frequencies (e.g., surface related photo-acoustic signatures, either surface acoustic waves confined to substrate, or sound waves coupled into gas/air surrounding the substrate).

Another possible embodiment is the placement of the system, apparatus, and other components thereof in a constant magnetic field with an oscillating magnetic field to separate the reactions by their S states (spin) and/or their L states (orbital angular momentum).

The illustrative systems, apparatus, and methods may be described as "opening up" techniques to analysis of surface states, such as occurs in catalytic effects in chemical reactions. The illustrative probe concepts may be described as being more useful and an easy adaptation into raster-scanning and large acre scanning applications. The analysis algorithms based on the interactions induced by various electromagnetic wavelengths that may make it possible to identify concentration of adsorbates through differential scan techniques, with time-current analysis, and their relationships to the underlying surface chemistry.

The illustrative systems, apparatus, and methods may be described as providing a model of sequential evolution of concentrations of adsorbates on photo-chemical processes is new. This model provides a new way of analyzing photo-chemical and photo-physical analyses of surface-dependent reactions. Further, the illustrative systems, apparatus, and methods may provide application of dependable results and predictions, identification of surface chemistry effects that lead to identification of chemical processes, and a minimization of exposure to UV radiation.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed:

1. A probe for collecting optically stimulated electron emission to inspect metastable states of a specimen on a surface, the probe comprising:
   a light source to emit light on the surface, wherein the light source comprises an ultraviolet light source;
   a collector configured to detect photoelectrons emitted from the surface in response to the light from the light source impinging on the surface and provide a photocurrent based on the detected photoelectrons; and
   a controller comprising at least one processor and operably coupled to the light source and the collector, the controller configured to:
   cause the light source to emit light on the surface to induce a sequence of surface-based photo-induced metastable states of the specimen;
   receive the photocurrent from the collector; and
   identify a sequence of decay constants respectively associated with the sequence of surface-based photo-induced metastable states of the specimen on the surface based on the received photocurrent, and
   identify the sequence of surface-based photo-induced metastable states of the specimen on the surface based on the identified sequence of decay constants.

2. The probe of claim 1, wherein the controller is further configured to determine a pattern of molecules on the surface based on the identified sequence of surface-based photo-induced metastable states of the specimen on the surface.

3. The probe of claim 1, wherein, to identify the sequence of surface-based photo-induced metastable states of the specimen on the surface, the controller is configured to:
   determine one or more rates of change of the photocurrent over a time period; and
   compare the one or more rates of change of the photocurrent over the time period to known rates of photocurrent change of metastable states of the specimen.

4. The probe of claim 1, wherein the controller is further configured to determine an amount of a catalyst on the surface based on the identified sequence of surface-based photo-induced metastable states of the specimen on the surface.

5. The probe of claim 1, wherein the controller is further configured to determine a chemical composition of the surface based on the identified sequence of surface-based photo-induced metastable states of the specimen on the surface.

6. A system for inspecting a surface, the system comprising:
   one or more optically stimulated electron emission (OSEE) pods, each pod comprising:
   a light source to emit light on the surface, wherein the light source comprises an ultraviolet light source; and
   a collector configured to detect photoelectrons emitted from the surface in response to the light from the light source impinging on the surface and provide a photocurrent based on the detected photoelectrons; and
   a controller comprising at least one processor and operably coupled to the one or more OSEE pods, the controller configured to:
   cause the light source of a first OSEE pod to emit light on a first area of the surface to induce a sequence of surface-based photo-induced metastable states of a specimen on the first area of the surface;
   receive a first photocurrent from the collector of the first OSEE pod; and
   identify a sequence of decay constants respectively associated with the sequence of surf ace-based photo-induced metastable states of the specimen on the first area of the surface based on the received first photocurrent, and
   identify the sequence of surface-based photo-induced metastable states of the specimen on the first area of the surface based on the identified sequence of decay constants.

7. The system of claim 6, wherein the system further comprises:
   one or more reference optically stimulated electron emission (OSEE) pods, each pod comprising:
   a reference light source to emit light on a reference surface, wherein the reference light source comprises an ultraviolet light; and a reference collector configured to detect photoelectrons emitted from the reference surface in response to the light from the reference light source impinging on the reference surface and provide a reference photocurrent based on the detected photoelectrons, wherein the controller is further operably coupled to the one or more reference OSEE pods and is further configured to:
cause the light source of a first reference OSEE pod to emit light on the reference surface to induce a sequence of surface-based photo-induced metastable states of a reference specimen on the reference surface;
receive a reference photocurrent from the reference collector of the first reference OSEE pod;
further identify a sequence of reference decay constants respectively associated with the sequence of surface-based photo-induced metastable states of the reference specimen on the reference surface based on the received reference photocurrent, and
identify the sequence of surface-based photo-induced metastable states of the specimen on the first area of the surface based on the further identified sequence of reference decay constants.

8. The system of claim 6, wherein the controller is further configured to:
cause the light source of a second OSEE pod to emit light on a second area of the surface to induce a sequence of surface-based photo-induced metastable states of a specimen on the second area of the surface;
receive a second photocurrent from the collector of the second OSEE pod;
identify a sequence of second decay constants respectively associated with the sequence of surface-based photo-induced metastable states of the specimen on the second area of the surface based on the received second photocurrent; and
identify the sequence of surface-based photo-induced metastable states of the specimen on the second area of the surface based on the identified sequence of decay constants respectively associated with the sequence of surface-based photo-induced metastable states of the specimen on the second area of the surface.

9. The system of claim 8, wherein the controller is further configured to determine a catalyst concentration gradient of the surface based on the identified sequence of surface-based photo-induced metastable states of the specimen on the first area of the surface and the identified sequence of surface-based photo-induced metastable states of the specimen on the second area of the surface.

10. The system of claim 8, wherein the controller is further configured to determine a difference between molecular patterns on the surface of the first and second areas of the surface based on the identified sequence of surface-based photo-induced metastable states of the specimen on the first area of the surface and the identified sequence of surface-based photo-induced metastable states of the specimen on the second area of the surface.

11. A probe for collecting optically stimulated electron emission to inspect metastable states of a specimen on a surface, the probe comprising:
a light source to emit light on the surface, wherein the light source comprises an ultraviolet light source;
a collector configured to detect photoelectrons emitted from the surface in response to the light from the light source impinging on the surface and provide a photocurrent based on the detected photoelectrons; and
a controller comprising at least one processor and operably coupled to the light source and the collector, the controller configured to:
cause the light source to emit light on the surface to induce at least one surface-based photo-induced metastable state of the specimen;
receive the photocurrent from the collector;
identify a full width at half maximum associated with the at least one surface-based photo-induced metastable state of the specimen on the surface based on the received photocurrent, wherein the full width at half maximum associated with the at least one surface-based photo-induced metastable state of the specimen is directly connected with a decay constant associated with the at least one surface-based photo-induced metastable state of the specimen; and
identify the at least one surface-based photo-induced metastable state of the specimen on the surface based on the identified full width at half maximum.

12. The probe of claim 11, wherein the controller is further configured to identify a sequence of surface-based photo-induced metastable states of the specimen based on the received photocurrent, wherein the sequence of surface-based photo-induced metastable states of the specimen includes two or more surface-based photo-induced metastable states of the specimen, wherein identifying the sequence of surface-based photo-induced metastable states of the specimen comprises identifying a sequence of full width at half maximums associated with specific surface-based photo-induced metastable states of the specimen.

13. The probe of claim 11, wherein the controller is further configured to determine a pattern of molecules on the surface based on the identified at least one surface-based photo-induced metastable state of the specimen on the surface.

14. The probe of claim 11, wherein, to identify the at least one surface-based photo-induced metastable state of the specimen on the surface, the controller is configured to:
determine one or more rates of change of the photocurrent over a time period; and
compare the one or more rates of change of the photocurrent over the time period to known rates of photocurrent change of metastable states of the specimen.

15. The probe of claim 11, wherein the controller is further configured to determine an amount of a catalyst on the surface based on the identified at least one surface-based photo-induced metastable state of the specimen on the surface.

16. The probe of claim 11, wherein the controller is further configured to determine a chemical composition of the surface based on the identified at least one surface-based photo-induced metastable state of the specimen on the surface.

* * * * *